(12) United States Patent
Misulia

(10) Patent No.: US 11,915,677 B2
(45) Date of Patent: Feb. 27, 2024

(54) SENSOR SUSPENSION SYSTEM AND ASSOCIATED DEPLOYMENT SYSTEMS FOR UNDERWATER DEPLOYMENT OF SENSOR ARRAY

(71) Applicant: Raytheon Company, Waltham, MA (US)

(72) Inventor: Joseph Misulia, Attleboro, MA (US)

(73) Assignee: Raytheon Company, Tewksbury, MA (US)

( * ) Notice: Subject to any disclaimer, the term of this patent is extended or adjusted under 35 U.S.C. 154(b) by 7 days.

(21) Appl. No.: 17/752,760

(22) Filed: May 24, 2022

(65) Prior Publication Data
US 2022/0284876 A1 Sep. 8, 2022

Related U.S. Application Data

(62) Division of application No. 16/417,363, filed on May 20, 2019, now Pat. No. 11,341,949.

(51) Int. Cl.
*G10K 11/00* (2006.01)
*G01S 7/521* (2006.01)
*B63B 22/00* (2006.01)
*B63C 11/48* (2006.01)
*G01S 7/00* (2006.01)

(52) U.S. Cl.
CPC ............ *G10K 11/006* (2013.01); *G01S 7/521* (2013.01); *G10K 11/008* (2013.01); *B63B 22/003* (2013.01); *B63C 11/48* (2013.01); *G01S 7/003* (2013.01)

(58) Field of Classification Search
CPC ...... G10K 11/006; G10K 11/008; G01S 7/521
See application file for complete search history.

(56) References Cited

U.S. PATENT DOCUMENTS

| 3,141,148 A | 7/1964 | Hueter |
| 3,329,015 A * | 7/1967 | Bakke ............... B63B 22/18 |
| | | 441/28 |
| 3,749,933 A | 7/1973 | Davidson |
| (Continued) | | |

FOREIGN PATENT DOCUMENTS

| CN | 104089694 A | 10/2014 |
| CN | 105387924 A | 3/2016 |
| (Continued) | | |

*Primary Examiner* — Ian J Lobo

(57) ABSTRACT

A sensor suspension system for use in an underwater environment comprises a sensor (e.g., vector sensor) and a framework comprising a plurality of support structures, and a plurality of compliant devices that suspend the sensor within an inner volume of the framework. The plurality of compliant devices facilitate a symmetrical sensing response of the sensor in three degrees of freedom when deployed in the underwater environment. The framework is moveable from a collapsed position to an expanded position. A plurality of sensor suspension systems can be tethered together into a sensor array by a deployment control system operable to release a buoyant device, tethered to the sensor suspension systems, that vertically positions the plurality of sensor suspension systems into the sensor array. The buoyant device can cause each framework to expand via pulling force through the tethers upon release of the buoyant device.

15 Claims, 16 Drawing Sheets

(56) References Cited

U.S. PATENT DOCUMENTS

| | | | |
|---|---|---|---|
| 3,886,491 A | | 5/1975 | Jonkey et al. |
| 4,007,436 A | * | 2/1977 | McMahon ............ G10K 11/006 |
| | | | 367/173 |
| 4,193,057 A | | 3/1980 | Bennett et al. |
| 4,216,535 A | | 8/1980 | Bennett |
| 4,298,964 A | | 11/1981 | Warnshuis, Jr. et al. |
| 4,494,938 A | | 1/1985 | Flood et al. |
| 4,853,900 A | * | 8/1989 | Snyderwine .......... B63B 22/003 |
| | | | 367/4 |
| 5,091,892 A | | 2/1992 | Secretan |
| 5,412,622 A | | 5/1995 | Pauer et al. |
| 5,963,506 A | * | 10/1999 | McEachern ............. B63B 22/04 |
| | | | 367/4 |
| 8,085,622 B2 | * | 12/2011 | Donskoy .................. G01P 5/02 |
| | | | 367/178 |
| 8,605,540 B2 | | 12/2013 | Baker et al. |
| 2011/0033062 A1 | * | 2/2011 | Deng ....................... H04R 1/38 |
| | | | 381/92 |

FOREIGN PATENT DOCUMENTS

| | | | |
|---|---|---|---|
| CN | 108020828 A | | 5/2018 |
| JP | H04-320986 A | | 11/1992 |
| JP | 2010-212874 A | | 9/2010 |
| JP | 2015-087160 A | | 5/2015 |

* cited by examiner

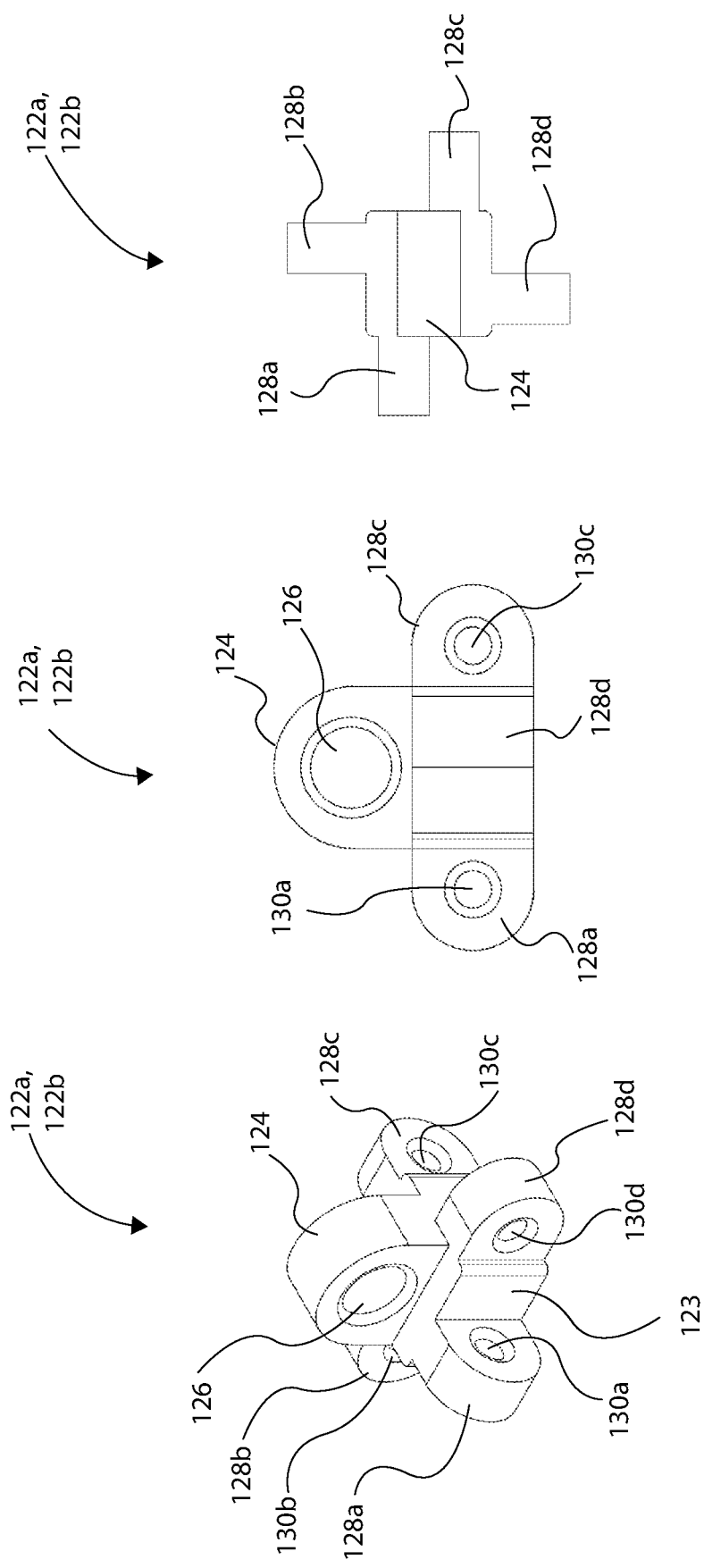

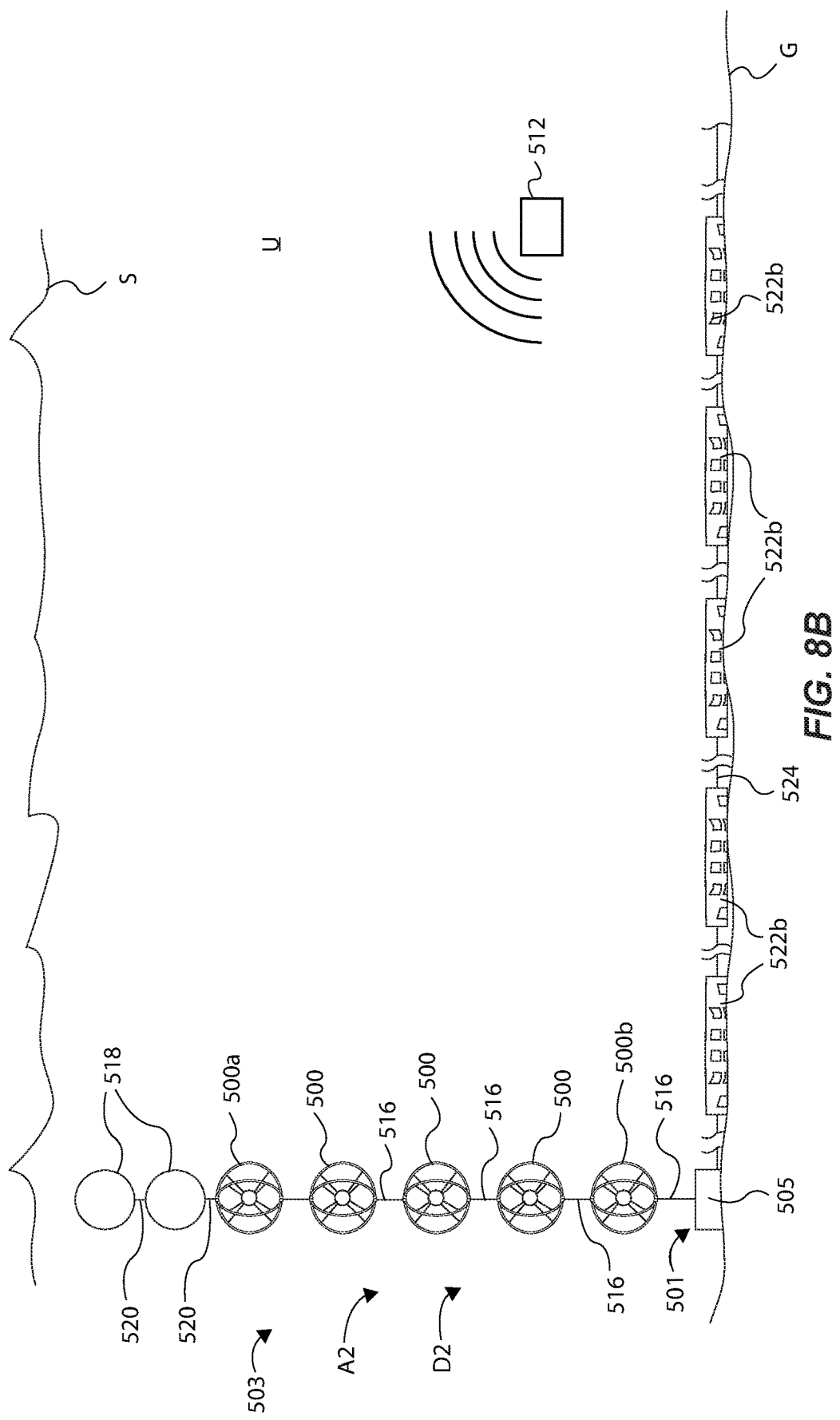

SENSOR SUSPENSION SYSTEM AND ASSOCIATED DEPLOYMENT SYSTEMS FOR UNDERWATER DEPLOYMENT OF SENSOR ARRAY

RELATED APPLICATIONS

This is a divisional application of U.S. application Ser. No. 16/417,363, filed May 20, 2019, entitled "Sensor Suspension System and Associated Deployment Systems for Underwater Deployment of Sensor Array", which is incorporated by reference in its entirety herein.

BACKGROUND

Underwater acoustic sensors, such as cantilever beam vector sensors, used for sensing sound waves must be generally free to move in a water column like a water particle during use to appropriately sense sound waves translating or propagating through the water. However, such sensors are extremely fragile and susceptible to damage, such as from shock loads experienced during shipping and handling of the sensor, or during deployment of the sensors into the water column. Prior attempts to address these concerns include packing each sensor (or a sensor array). In one example, each sensor (or sensor array) can be packed in sonotubes enclosed in syntactic shells or rigid foam, and then the shells coupled together via cables. However, such approach has proven ineffective, the approach still leading to mechanical damage of the sensors of various degree, resulting in partial or total failure of the sensors. Even slight damage to the sensors can negatively affect the sensor's (or sensors') ability to effectively generate sensor data when deployed underwater.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2A is an isometric view of a hub component of the sensor suspension system of FIG. 1A.

FIG. 2B is a side view of the hub component of FIG. 2A.

FIG. 2C is a top view of the hub component of FIG. 2A.

FIG. 8B is a schematic elevation view of the sensor array deployment system of FIG. 8A, and showing the plurality of sensor suspension systems released from their respective sensor release systems and deployed by a deployment control system of the sensor array deployment system into a sensor array in the underwater environment.

Figure 1A:
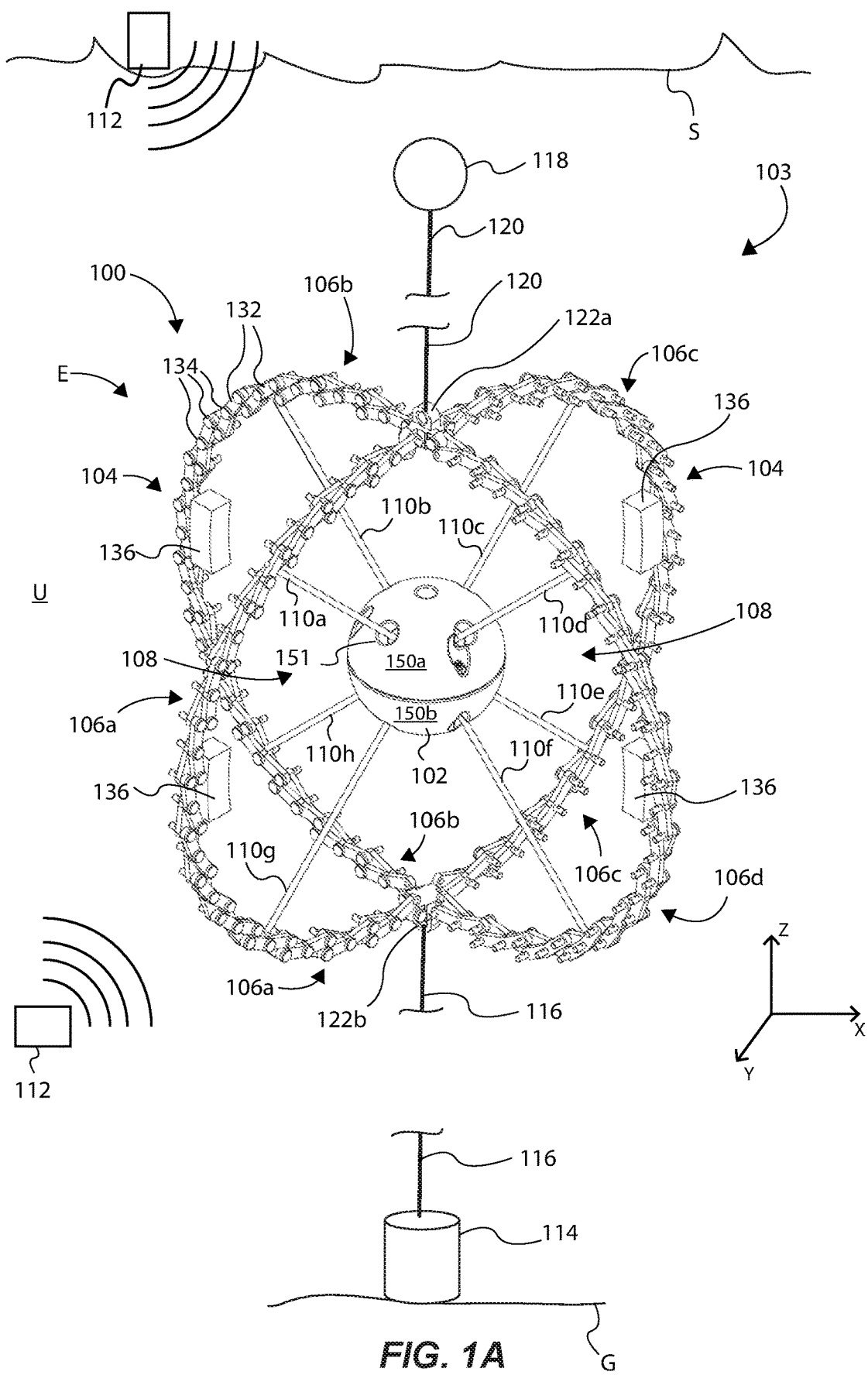
FIG. 1A is an isometric view of a sensor array deployment system in accordance with an example of the present disclosure, the sensor array deployment system comprising at least one sensor suspension system being shown in an expanded position, and positioned in an underwater environment.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a sensor suspension system for use in an underwater environment, in accordance with an example of the present disclosure. The sensor suspension system can comprise a sensor, and a framework comprising a plurality of support structures, and defining an inner volume sized and configured to receive the sensor. A plurality of compliant devices can extend between the framework and the sensor, and can extend in different directions from the sensor within the inner volume of the framework so as to suspend the sensor within the inner volume. The plurality of compliant devices can facilitate a symmetrical sensing response of the sensor in at least one degree of freedom upon being (i.e., when) deployed in the underwater environment.

In one example, the plurality of compliant devices are constructed of an elastomeric material, and are tuned such that a resulting resonant frequency of the sensor, as suspended by the plurality of compliant devices and when deployed in the underwater environment, is outside of a frequency of interest band of the sensor.

In one example, the plurality of support structures each comprise a plurality of linkages pivotally coupled together, such that the framework is moveable between a collapsed position and an expanded position, relative to the sensor, via pivotal movement of the linkages.

In one example, the sensor suspension system comprises an upper hub component pivotally coupling together upper ends of each of the plurality of support structures. The upper and lower hub components can facilitate movement of the framework from the collapsed position to the expanded position.

The present disclosure sets forth a sensor array deployment system for deploying a sensor array in an underwater environment. The sensor array deployment system can comprise a deployment control system operable for placement on an underwater surface of an underwater environment, and a plurality of sensor suspension systems tethered together and to the deployment control system in a stowed configuration. Each sensor suspension system can comprise a framework and a sensor suspended by a plurality of compliant devices coupling the sensor to the framework. The sensor array deployment system can comprise at least one buoyant device operable with the plurality of sensor suspension systems. Upon being placed on the underwater surface, the deployment control system is operable to be activated to release the at least one buoyant device and cause deployment of the plurality of sensor suspension systems. The buoyant device being operable to ascend towards a surface of the water to vertically position the plurality of sensor suspension systems into a sensor array while anchored to the deployment control system.

In one example, the plurality of sensor suspension systems are tethered together in series via a plurality of tethers.

In one example, the deployment control system comprises a receiver and a controller communicatively coupled together. The controller configured to facilitate release of the at least one buoyant device, so that, in response to the receiver receiving an acoustic deployment signal from a transmitter, the controller is caused to release of the at least one buoyant device.

The present disclosure sets forth a method for deploying a sensor array in an underwater environment. The method can comprise positioning a deployment control system on an underwater surface of an underwater environment. The deployment control system supporting a plurality of sensor suspension systems tethered together, and supporting at least one buoyant device tethered to sensor suspension systems. The method can comprise causing release of the at least one buoyant device to deploy the plurality of sensor suspension systems, such that the at least one buoyant device ascends towards a surface of the water to vertically position the plurality of sensor suspension systems into a sensor array in the underwater environment while anchored to the deployment control system.

To further describe the present technology, examples are now provided with reference to the figures.

FIGS. 1A-1H show various aspects and views of an example sensor suspension system 100 as part of a sensor array deployment system 103 (see FIG. 1), in accordance with an example of the present disclosure. FIGS. 2A-2C illustrate an upper hub component 122a. With reference to FIGS. 1A-2C, the sensor array deployment system 103 can comprise the at least one sensor suspension system 100 for deployment and use in an underwater environment U. For example, the sensor array deployment system 103 can comprise a plurality of sensor suspension systems 100 as part of a sensor array. As an overview, the sensor suspension system(s) 100 can comprise a sensor 102 (e.g., acoustic sensor) and a framework 104 comprising a plurality of support structures 106a-d defining an inner volume 108 sized and configured to receive the sensor 102, and to facilitate support of the sensor 102 in a suspended position and arrangement. The sensor suspension system 100 can further comprise a plurality of compliant devices 110a-h (e.g., elastomeric bands or cords) extending between the framework 104 and the sensor 102 so as to suspend the sensor 102 within the inner volume 108. At least some of the plurality of compliant devices 110a-h can extend in different directions from the sensor 102 within the inner volume 108 of the framework 104 to facilitate a symmetrical sensing response of the sensor 102 in at least one degree of freedom (e.g., at least one of one, two or three degrees of freedom) upon being deployed and used in the underwater environment U.

The sensor 102 can be configured as a sensor assembly, such as an underwater acoustic sensor that senses acoustic waves that impinge onto and through the sensor 102. For instance, the sensor 102 can be an available vector sensor assembly having a number of accelerometers, etc. supported by a housing of the sensor 102. A primary purpose of sensing in this manner is it to generate sensor output data to assist with determination of a position (2D and/or 3D position) of an object 112 that is underwater, and/or an object that is on a surface S of the water. For instance, the object 112 may be an underwater vehicle, a surface vessel, a torpedo, a mammal, or any other object that may emit sound waves through the underwater environment U. Thus, to effectively sense such sound waves, the sensor 102 should generally be able to freely move and act like a water particle in a water column, so that it can appropriately and accurately generate sensor output data associated with sound waves emitted by the object 112. When a plurality of such sensors (e.g., 102) are arranged in a sensor array through the water column (e.g., FIGS. 6B and 8B), the sensor array can collect or generate sensor output data used with determination of the object type and/or 3D position of the object 112, for instance, in a traditional manner of processing such sensor output data.

The sensor suspension system 100 can be suspended in the underwater environment U by being tethered or attached to a base or anchor 114 via a tether 116 (e.g., flexible inelastic cable or cord or other type as will be apparent to those skilled in the art) that secures the sensor suspension system 100 to an underwater surface G of the underwater environment U. The top or upper area of the framework 104 of the sensor suspension system 100 can be similarly tethered to a buoyant device 118 via a tether 120. That is, the buoyant device 118 (e.g., buoy, air bladder, or other type as will be apparent to those skilled in the art) can have a positive buoyancy that applies an upward pulling force on the sensor suspension system 100 toward the surface S of the water environment U, thereby suspending the sensor suspension system 100 within the water environment U.

As mentioned above, at least some of the plurality of compliant devices 110a-h can extend in different directions from the sensor 102 to suspend the sensor 102 about the framework 104 to facilitate a symmetrical sensing response of the sensor 102 in at least one degree of freedom when in the underwater environment U. One degree of freedom of movement or sensing response of the sensor 102 can be about any one of the x, y, or z axes, any two of these, or all of them. Thus, up to three degrees of freedom of movement or sensing response of the sensor 102 can occur in all any one, any combination, or all three of the xyz axes. If one or more of these degrees of freedom is constrained, then the sensor 102 may not generate accurate or useful sensor data associated with sound waves impinging on and sensed by the sensor 102, as such, in most cases it is desirable to configure the sensor suspension system 100 to sense a response in all three degrees of freedom of the xyz axes. Indeed, because the plurality of compliant device 110a-h extend in different directions relative to each other from the sensor 102 to the framework 104, which surrounds the sensor 102, the sensor 102 can have a symmetrical sensing response in all three xyz axes. This is because one or more of the plurality of compliant device 110a-h may slightly deflect (e.g., compress or expand) and/or vibrate/resonate in response to sound waves impinging on the sensor 102 so that the sensor 102 can act or mimic a water particle, so that no matter which direction the sound waves originate from, the sensor 102 will respond symmetrically relative to the xyz axes.

The result is that the sensor 102 can more effectively generate accurate sensor data as compared to prior systems that support one or more sensors that are rigidly constrained in at least one of the xyz axes. For instance, some prior systems are configured, such that a particular sensor is rigidly mounted to a frame or other structure about the z axis and deployed in the water column (so that it is rigidly constrained to the underwater surface, or to a vessel on the surface). In this case, the sensor would not have provide symmetrical sensing as it is unable to provide an accurate sensing response in the z axis because the sensor is constrained and not permitted to resonate or move in the z axis. Thus, any sound waves translated generally about the z axis through the water would not be accurately or effectively sensed by the sensor because it is constrained in at least one degree of freedom (i.e., the z axis). Unlike this and other prior systems, the sensor 102 of the present technology is supported in a suspended manner, such that it is able to provide sensing responses in all three xyz axes.

Notably, the compliant devices 110a-h can be "tuned" or designed such that the sensor suspension system 100 has a very low resonant frequency (e.g., below 5 Hz) when deployed in the underwater environment U, so that the sensor 102 can move or act as a water particle at the frequencies of interest. Thus, the compliant devices 110a-h can be tuned, such that a resulting resonant frequency of the sensor 102, as suspended by the plurality of compliant devices 110a-h and when deployed in the underwater environment, is outside of a frequency of interest band of the sensor 102. For instance, a torpedo propelled through the water may have a known frequency range that the sensor 102 may be "interested" in capturing (i.e., the frequency of interest band of the sensor 102). Based on this known frequency range, the compliant devices 110a-h can be designed or tuned so that the sensor 102 can accurately sense sound waves emitted by the torpedo at particular frequencies. That is, the resulting resonant frequency of the sensor 102 and suspension system 100 will be outside of the frequency of interest band of the sensor 102 itself because of the particular tuning or design of the compliant devices 110a-h. If the resulting resonant frequency of the sensor 102 and associated sensor suspension system 100 were within the frequency of interest band of the sensor 102, then the sensor 102 may not be able to effectively sense sound waves emitted by the torpedo, for instance. In one example, each compliant device (e.g., 110a-h) can comprise an elastomeric band or cord, which can comprise a plurality of bands collected together like a bungie cord, or each compliant device can be a single elastomeric band. The length, thickness, and durometer of each compliant device can be selected based on the aforementioned frequencies of interest, and therefore, the compliant devices 110a-h can be tuned as exemplified above.

In an alternative example, only two compliant devices may be utilized to suspend a sensor about a framework. For instance, a first compliant device can be attached to, and extend upwardly from, the sensor and then attached to an upper area of the framework, and a second compliant device can be attached to, and extend downwardly from, the sensor and then attached to the lower area of the framework. Thus, these two compliant devices could extend generally vertically and along the z axis. This would produce symmetrical sensing response of the sensor in only the z axis (i.e., one degree of freedom), which may be useful in some applications. A person having ordinary skill in the art would recognize that, in other examples, two compliant devices could extend horizontally and along the x axis, or along the y axis, for the respective symmetrical response about those particular axes.

Referring again to FIGS. 1A-2C, the plurality of compliant devices 110a-h can comprise a first (upper) set of compliant devices 110a-d coupled to the sensor 102, and a second (lower) set of compliant devices 110e-h that can be coupled to the sensor 102 on an opposite side of the sensor 102 from the first set of compliant devices 110a-d. Note that each compliant device 110a-h does not extend entirely along any one particular x, y, or z axis. That is, each compliant device 110a-h extends through all three of the xyz axes. In this manner, the compliant devices 110a-h cooperate to facilitate a symmetrical sensing response of the sensor 102 in three degrees of freedom about the xyz axes.

Note that particular opposing compliant devices can be oriented to extend along the same linear direction or path, but this is not required, or intended to be limiting in any way. For instance, the compliant device 110a extends along the same or similar linear path as the opposite compliant device 110e on the other side of the sensor 102. The same is true for other opposing sets of compliant devices. In this manner, the plurality of compliant devices 110a-h cooperate to facilitate symmetrical sensing response of the sensor 102 in three degrees of freedom xyz of movement upon being deployed in the underwater environment U.

Figure 1B:
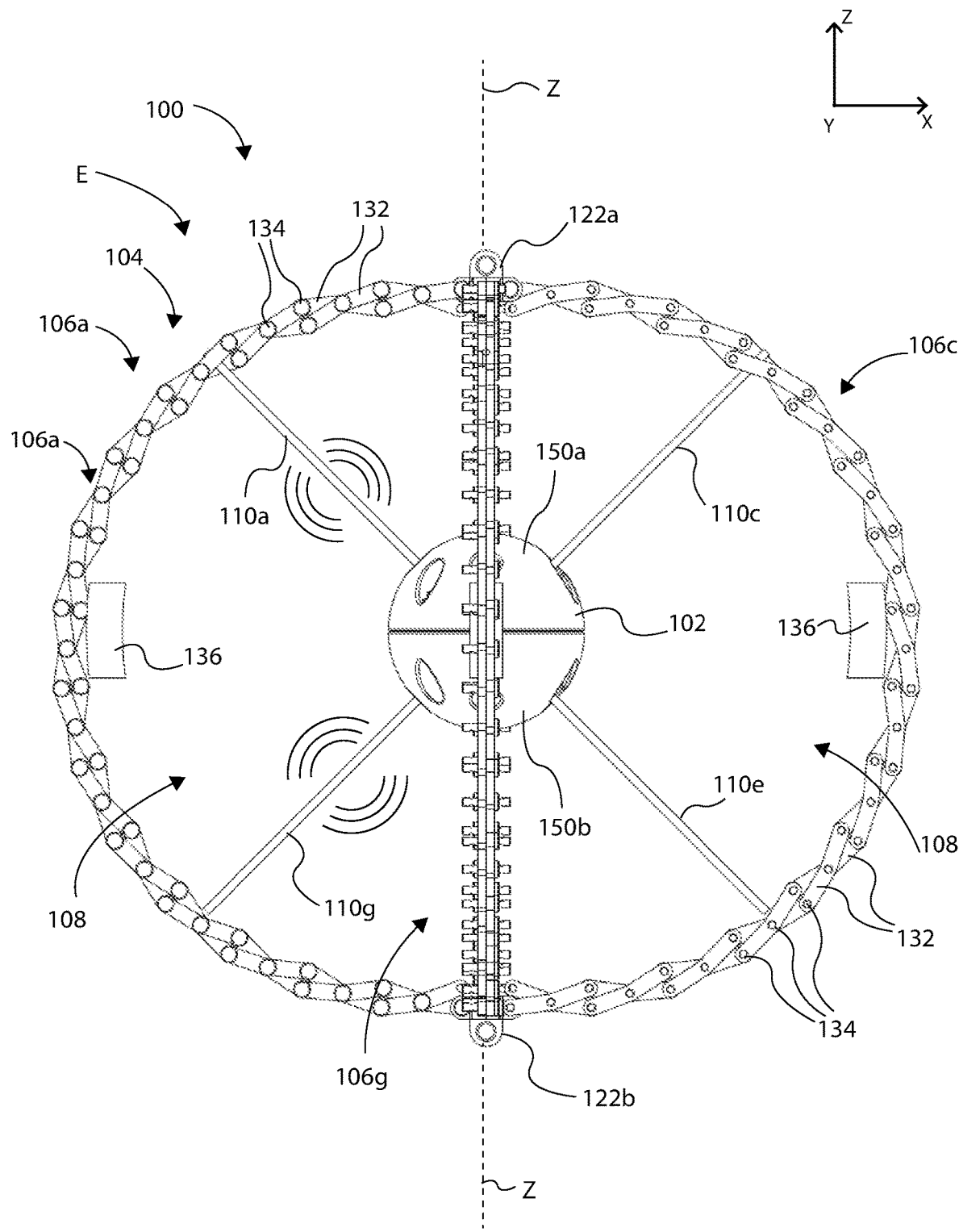
FIG. 1B is a side view of the sensor suspension system of FIG. 1A.
Figure 1C:
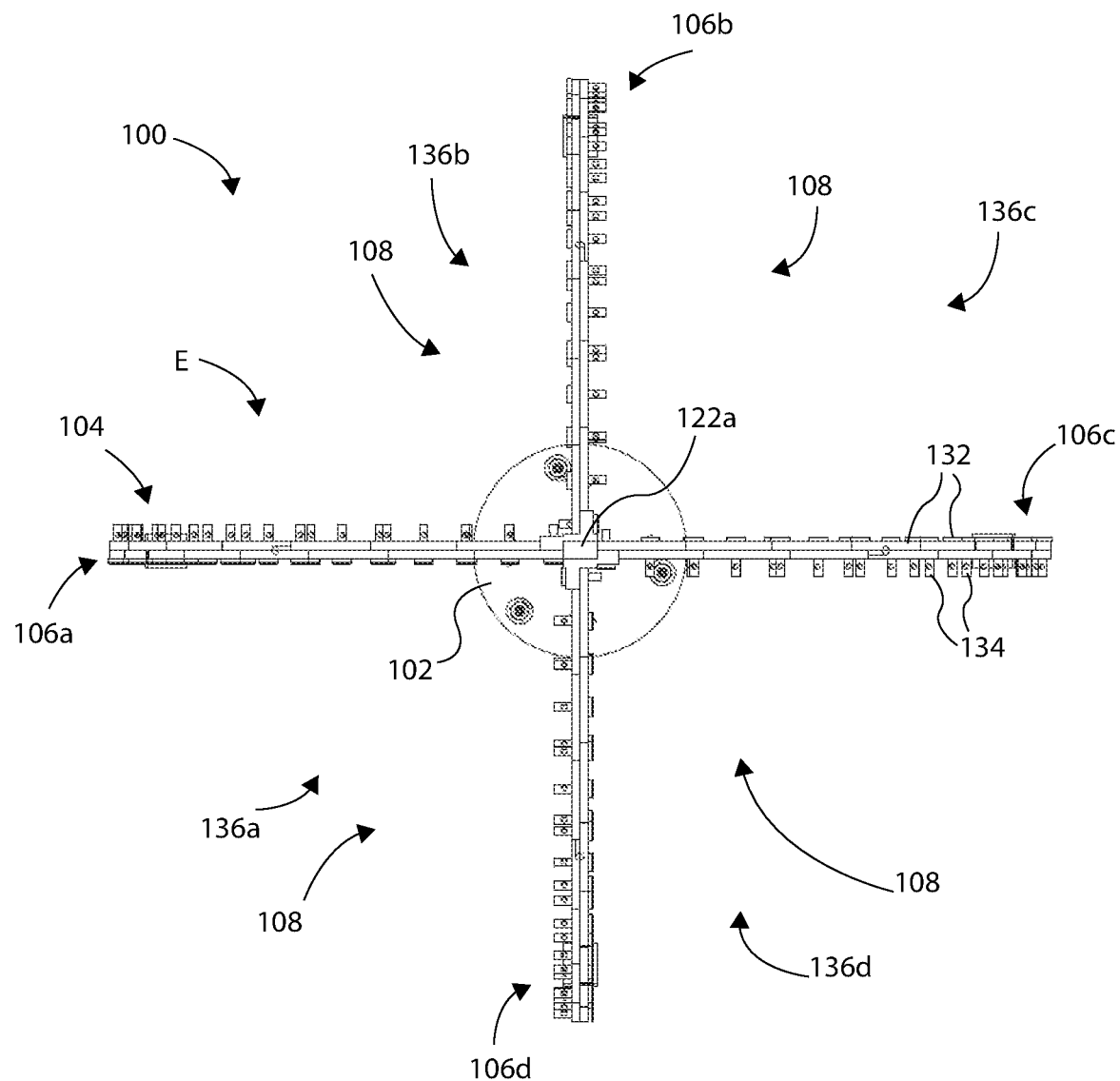
FIG. 1C is a top view of the sensor suspension system of FIG. 1A.
Figure 1D:
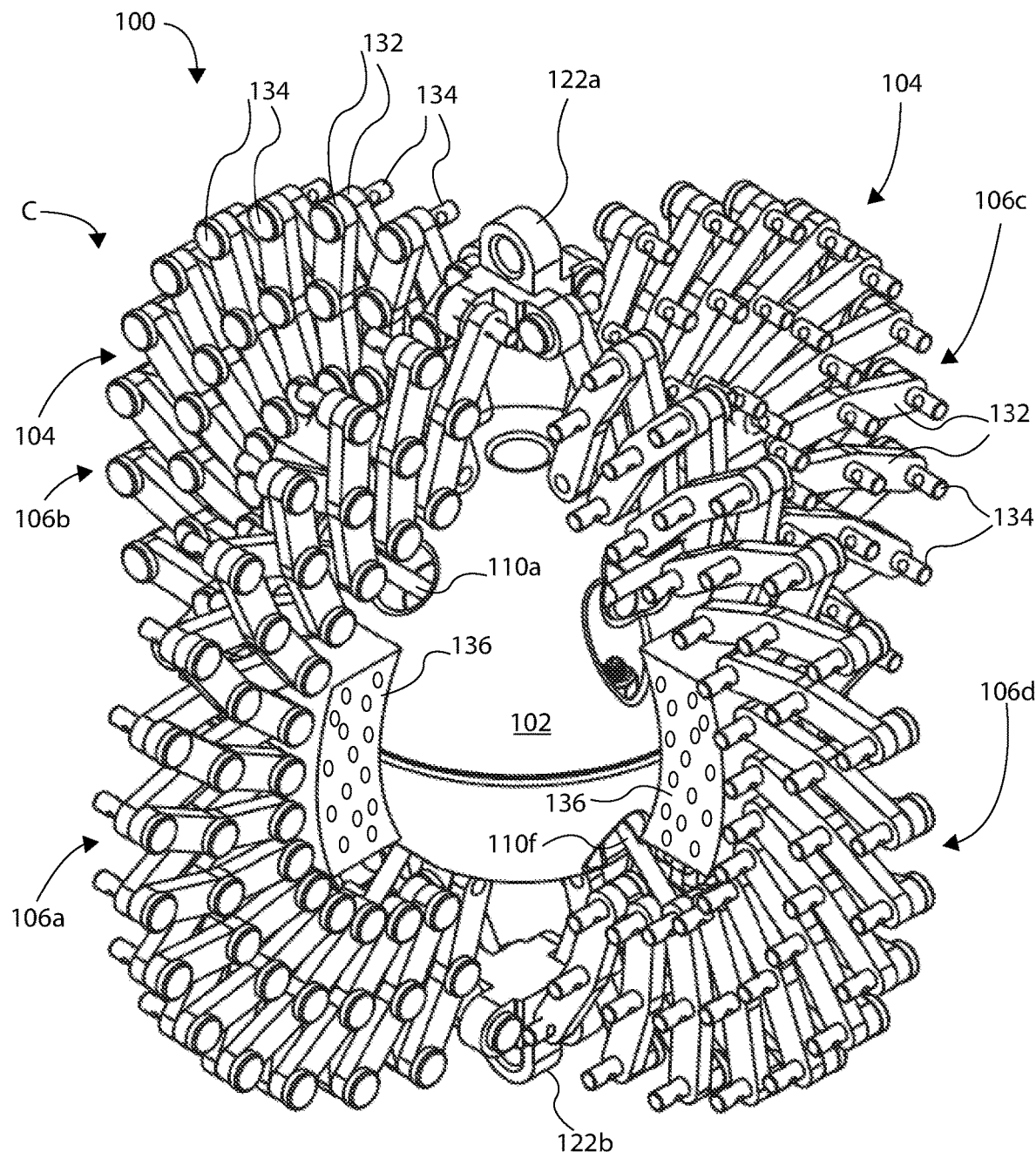
FIG. 1D is an isometric view of the sensor suspension system of FIG. 1A, shown in a collapsed position.
Figure 1E:
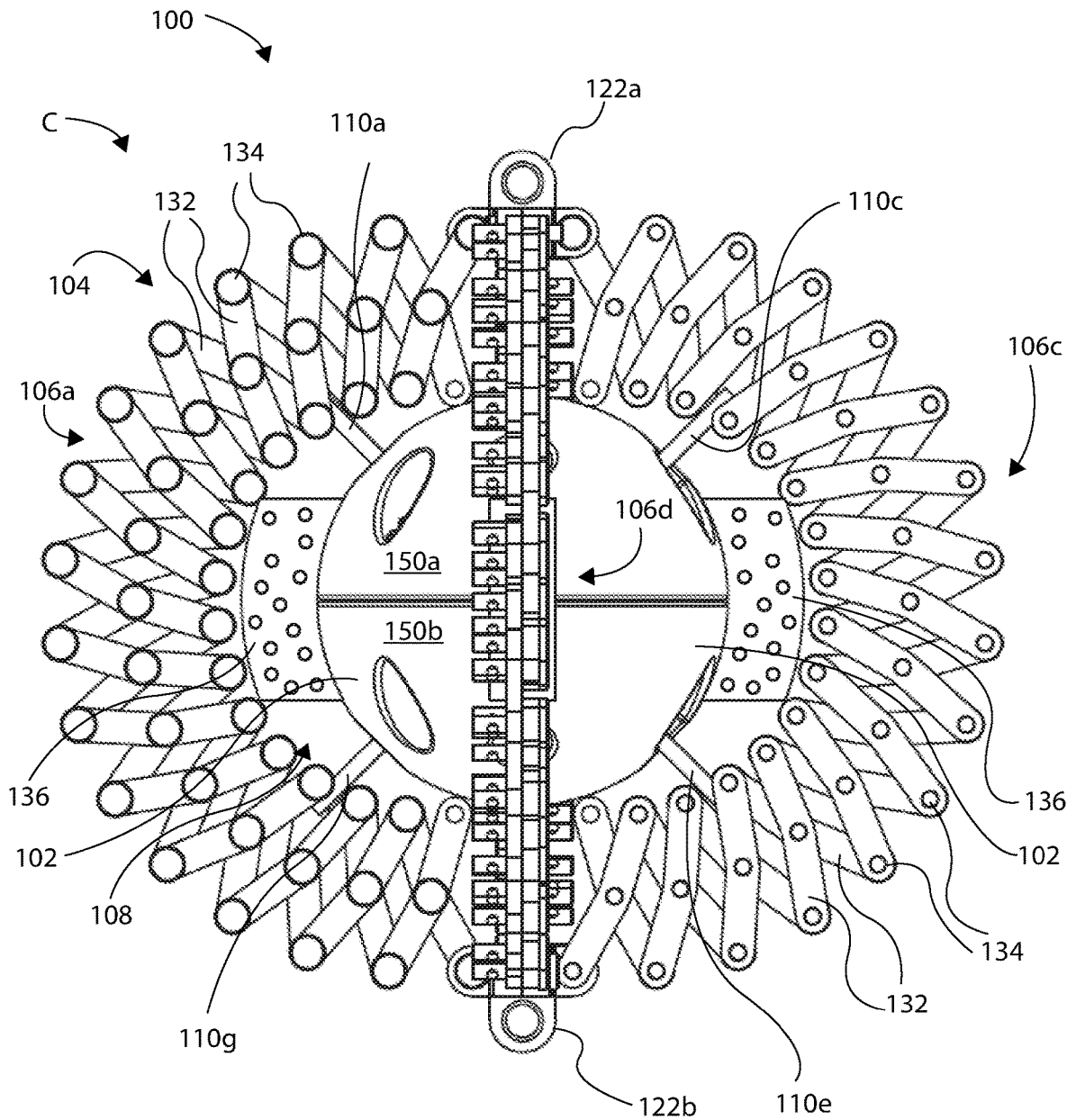
FIG. 1E is a side view of the sensor suspension system of FIG. 1A, shown in a collapsed position.
Figure 1F:
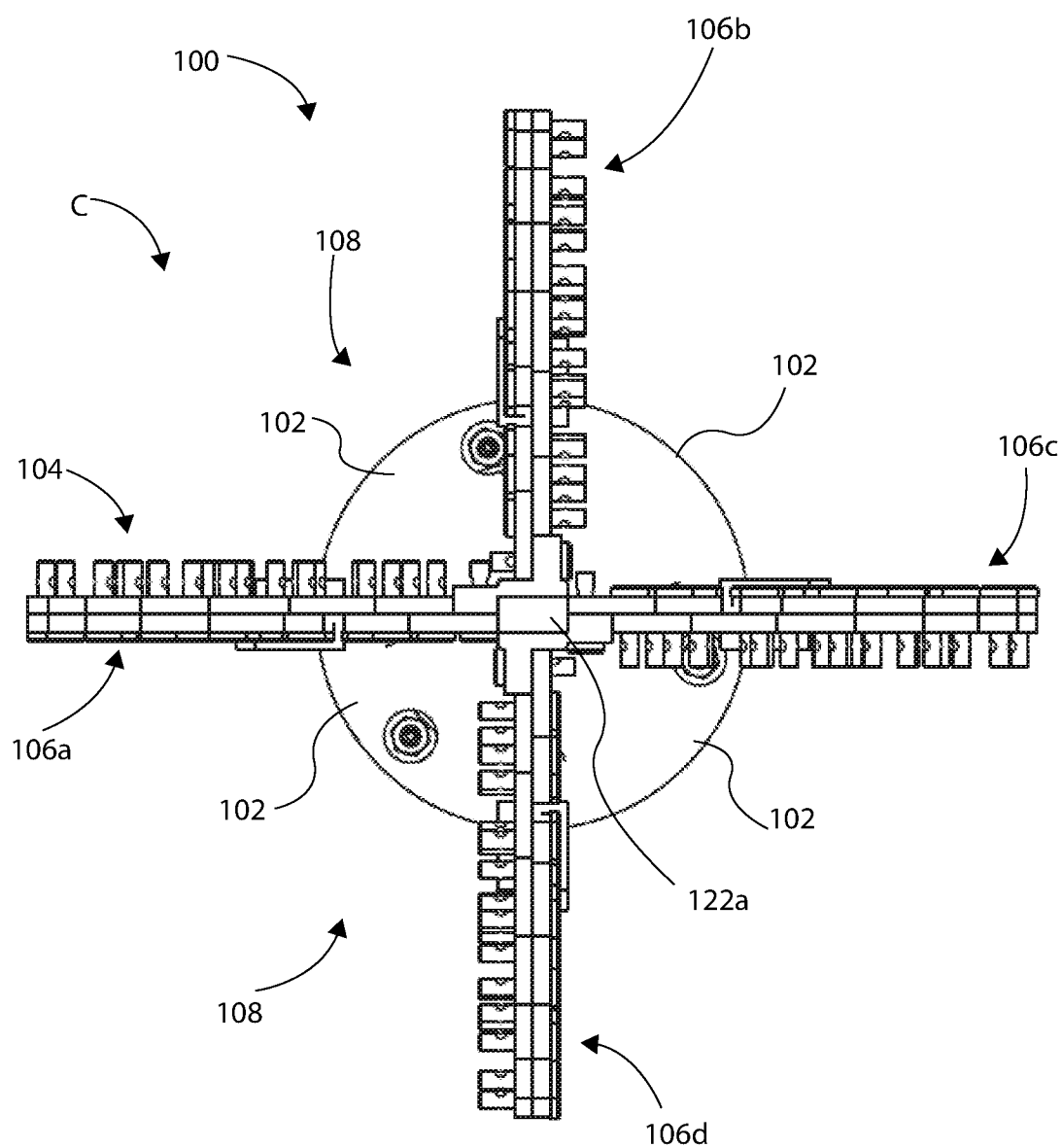
FIG. 1F is a top view of the sensor suspension system of FIG. 1A, shown in a collapsed position.
Figure 1G:
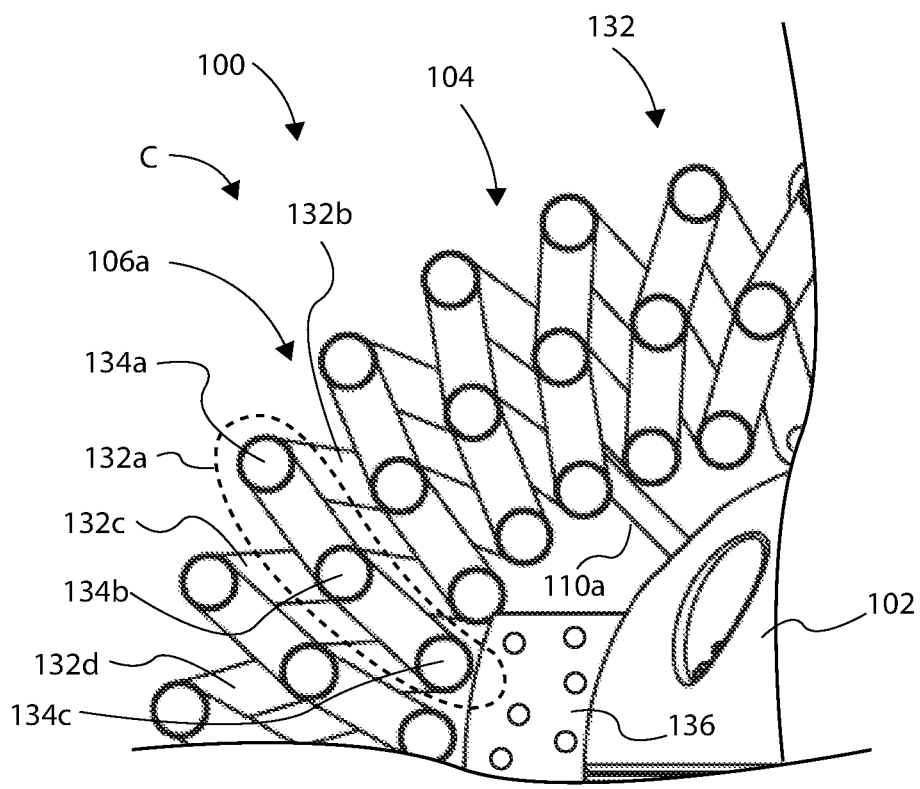
FIG. 1G is a close up view of part of the sensor suspension system of FIG. 1A, showing the support structure in the collapsed position.

The plurality of support structures 106a-d of the framework 104 can comprises the four support structures shown, which can define a substantially spherical or oval envelope or shape, as illustrated in FIGS. 1A-1C surrounding the sensor 102, and defining the inner volume 108. In other examples, a particular framework can have more than four support structures (e.g., see the six support structures shown in the example of FIG. 4, as further discussed below). Furthermore, in some examples a particular framework can define a different three dimensional envelope or shape, such as a cuboid (e.g., see FIG. 5), cylinder, cone, cube, tetrahedron, or any suitable three dimensional shape or envelope.

The sensor suspension system 100 can further comprise a first or upper hub component 122a coupling together upper ends of each of the plurality of support structures 106a-d, and a second or lower hub component 122b coupling together lower ends of each of the plurality of support structures 106a-d. The upper hub component 122a can be attached to the tether 120 that is supported by the buoyant device 118 (or the tether 120 can be coupled to an adjacent/upper sensor suspension system 100, as shown in the examples of the sensor arrays of FIGS. 6B and 8B, discussed below). The lower hub component 122b can be attached to the tether 116 that is supported or tethered to the base or anchor 114 (or the tether 116 can be coupled to an adjacent/lower sensor suspension system 100, as shown in the examples of FIGS. 6B and 8B).

In one example, the sensor 102 can comprise a cantilever beam type vector sensor assembly, which is well known and will not be discussed in detail. Alternatively, the sensor 102 can comprise other available sensors as will be apparent to those skilled in the art. In the example shown, the sensor 102 can comprise upper and lower housings or housing halves 150a and 150b, which can each be hemispherical-shaped housing halves that are fastened or coupled together to form a spherically shaped sensor or sensor assembly. One terminal end of each compliant device 110a-h can extend into respective apertures 151 (one labeled in FIG. 1A) of the upper and lower housings 150a and 150b, and then the terminal ends can be coupled or attached to respective upper and lower housings 150a and 150b in any suitable manner. For instance, a fastener or other coupling device can attach the terminal ends of the compliant devices to the respective housings 150a and 150b, or compliant O-rings can be coupled to the terminal ends and then attached to the respective housings 150a and 150b by suitable means. The other distal ends of each compliant device 110a-h can be attached to areas or portions of respective support structures 106a-d by suitable means, such as via a compliant O-ring 148 (FIG. 1H) that is looped or wrapped around one of the links or joints of the support structure 106a, for instance, as further discussed below. In one example, each compliant device 110a-h can be an elastic O-ring itself that is looped around a portion of the framework 104 and then looped through a hook or other feature on the sensor 102.

Note that the particular attachment portion of the respective support structures 106a-d (that the compliant devices 110a-h are attached to) are selected to be at the same or similar locations relative to each other. For instance, the terminal end of compliant devices 110a-d are all attached at the same or similar relative locations on their respective support structures 106a-d, which further facilitates or contributes to the aforementioned symmetrical sensing response of the sensor 102 about three degrees of freedom.

With regard to the expandability functionality of the framework 104, FIGS. 1D-1G show the framework 104 in a collapsed position C, and FIGS. 1A-1C and 1H show the framework 104 moved to an expanded position E. The construction and configuration of the framework 104, and the construction and configuration of the upper and lower hub components 122a and 122b, facilitate moving between these collapsed and expanded positions.

More specifically, the upper hub component 122a (see FIGS. 2A-2C for a more detailed view of the upper hub component 122a (which can be the same construction and configuration as the lower hub component 122b)) can be constructed of a rigid material, such as stainless steel, aluminum, titanium, composites, polymer, or other material types or combination of materials as will be apparent to those skilled in the art. The upper hub component 122a can comprise a tether attachment portion 124 defining and having an aperture 126 for facilitating coupling of the upper hub component 122a to a tether (e.g., see tether 120 of FIG. 1A), and a plurality of frame attachment portions 128a-d defining and having respective apertures 130a-d for facilitating coupling the upper hub component 122a to ends of respective support structures 106a-d. The tether attachment portion 124 and the plurality of frame attachment portions 128a-d can extend in different directions from one another. For example, as shown, the tether attachment portion 124 can extend upwardly and away from the plurality of frame attachment portions 128a-d, while the plurality of frame attachment portions 128a-d each extend in different directions from each other and laterally outwardly from the tether attachment portion 124. The tether attachment portion 124 and the plurality of frame attachment portions 128a-d can be supported about the same base or core structural element 123.

An end of the end link of the support structure 106a can be pivotally coupled to the frame attachment portion 128a of the upper hub component 122a via a joint members (e.g., a pin) supported on the support structure 106a that extends through the aperture 130a, thereby coupling the support structure 106a to the upper hub component 122a. The same is true for the other support structures 106b-d being pivotally coupled to respective frame attachment portions 128b-d in a similar manner as for the upper hub component 122a. The same is true for other ends of the support structures 106a-d being pivotally coupled to respective frame attachment portions 128a-d of the lower hub component 122b in a similar manner as with the upper hub component 122a. See also FIG. 3B, showing the support structures 106a-d pivotally coupled to a similar, but alternative, hub component 222.

As noted above, one purpose of pivotally coupling ends of the support structures 106a-d to the upper and lower hub components 122a and 122b is to facilitate moving the framework 104 between the collapsed position C and the expanded position E about or relative to the sensor 102, so that the sensor 102 operates when in the expanded position E. When moved to the expanded position E, the compliant devices 110a-h stretch so that the sensor 102 is suspended by the stretched compliant devices 110a-h. Thus, each compliant device 110a-h can have substantially the same length, durometer, and size, so that the sensor 102 is generally supported about a center or centroid of the inner volume 108 of the framework 104.

Further regarding the expandability of the framework 104, the plurality of support structures 106a-d can each comprise a plurality of linkages 132 (e.g., see linkages 132a-d as specific examples) pivotally coupled together by a plurality of joint members 134 (e.g., pins, rivets, pin/water/ cotter pin assemblies, etc.), which allows each support structure 106a-d to expand and collapse together while pivoting about the upper and lower hub components 122a and 122b. More specifically (see the close-up views of FIGS. 1G and 1H), any particular linkage 132, linkage 132a for instance, can comprise three apertures (hidden from view) through which three respective joint members 134a-c extend through for pivotally coupling the linkage 132a to three adjacent linkages, linkages 132c-d for instance. That is, each joint member 134a-c extends through a respective aperture of a respective adjoining or adjacent linkage 132b-d. Thus, each joint member 134 of the framework 104 will extend through two particular linkages 132 to join and pivotally couple together the two particular linkages 132. This pattern or configuration can be the same or similar for all the other linkages of the support structures 106a-d.

Figure 1H:
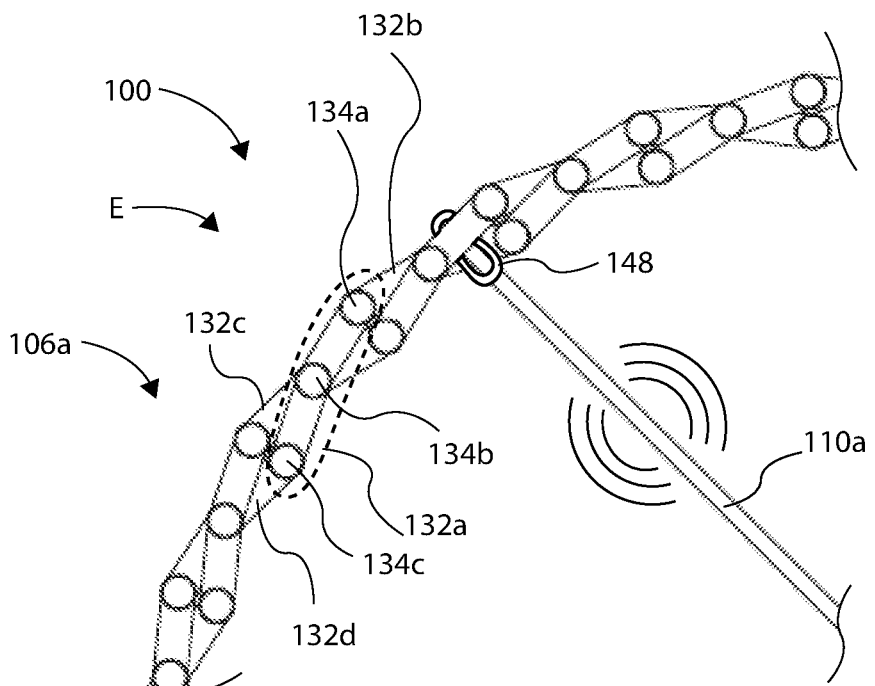
FIG. 1H is a close up view of part of the sensor suspension system of FIG. 1A, showing the support structure in the expanded position.

The linkages 132 can be flat plates formed of a rigid material (e.g., stainless steel, aluminum, titanium, composite, or any other material or combination of materials as will be apparent to those skilled in the art), and can be any suitable shape and size that cooperate together to facilitate expanding and collapsing of the support structures 106a-d. For instance, the linkages 132 can have a non-linear shape along their lengths, as shown, such that the linkages 132 each have a first and second linear sections that are formed at an angle relative to each other, so that the linkages 132 are somewhat bent or formed inwardly toward the inner volume 108 or sensor 102. In this way, the linkages 132, and/or their joint members 134, can act as "stops" for adjacent linkages 132 when moved to the expanded position E, as shown in FIG. 1H, thereby facilitating achieving and maintaining the shape of the expanded position E. This helps to prevent the support structure 106a from over rotating or expanding into an undesirable shape or form. This further permits the linkages 132 to nest with one another as the framework 104 is collapsed.

In one example, the sensor suspension system 100 can comprise damping material, such as spacer cushions 136 (e.g., FIG. 1D), each supported about an inner side of one of the support structures 106a-d, such that the spacer cushions 136 are situated between the support structures 106a-d and the sensor 102. The spacer cushions 136 can comprise foam or other compliant or elastic material that acts as a cushion or compliant buffer between the support structures 106a-d and the sensor 102 when in the collapsed position C. This is useful to protect the sensitive or fragile components of the sensor 102 during storage and transport of the sensor suspension systems 100 when in the collapsed position C, as well as to provide a gripping force to the sensor 102, thus limiting movement of the sensor 102 relative to the framework 104.

The spacer cushions 136 can be attached to inner side areas of respective support structures 106a-d by suitable means, such as by adhesive, attachment devices (O-rings), or other fastening means. Thus, when in the collapsed position C, the framework 104 provides a rugged, compact configuration to protect the sensor 102 from any impact shock, while the spacer cushions 136 operate to dampen or attenuate any shock or vibration that may be experienced by and propagated through the framework 104 during transportation and/or stowage.

Notably, when the framework 104 is in the expanded position E, it is symmetrical about a central plane Z (FIG. 1B) that extends vertically through a centroid or central point of the sensor suspension system 100 (and also symmetrical when in the collapsed position C). This contributes to facilitating symmetrical sensing response of the sensor 102, because sound waves can translate through the framework 104 from any direction. In addition, when expanded the plurality of support structures 106a-d can form or define a plurality of openings 136a-d (FIG. 10) between adjacent support structures 106a-d. These openings 136a-d can each be shaped as a section of a sphere extending from a north to south pole, generally. These openings 136a-d are also relatively large compared to the size and thickness of the support structures 106a-d, so that sound waves can pass through the openings 136a-d to the sensor 102 without the framework 104 noticeably impinging or inhibiting or otherwise interfering with the sound waves as they penetrate the outer boundary or envelope defined by the sensor suspension system 100, and as they reach the sensor 102. This is because each support structure 106a-d is relatively thin when expanded, which maximizes or optimizes the sensing capabilities of the sensor 102 because such configuration generates relatively large openings 136a-d or three dimensional areas. Described differently, the support structures 106a-d comprise or occupy a relatively small amount or portion (e.g., less than 10%) of a perimeter envelope boundary defined by the sensor suspension system 100, thus leaving most of the envelope boundary defined by the spacing or gaps or areas between the support structures 106a-d.

Figure 3A:
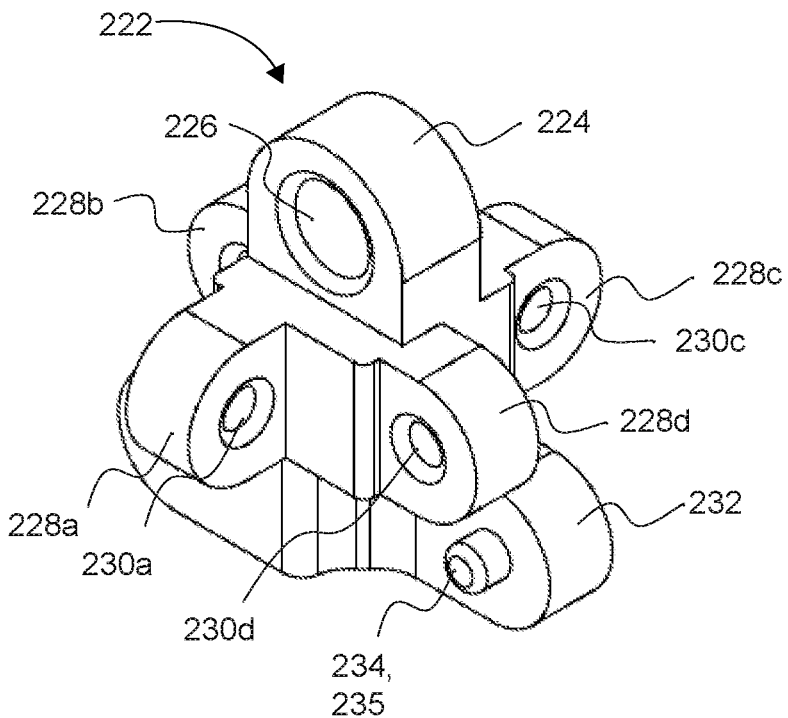
FIG. 3A is an isometric view of an alternative hub component that can replace the hub component(s) of FIG. 1A, in accordance with an example of the present disclosure.
Figure 3B:
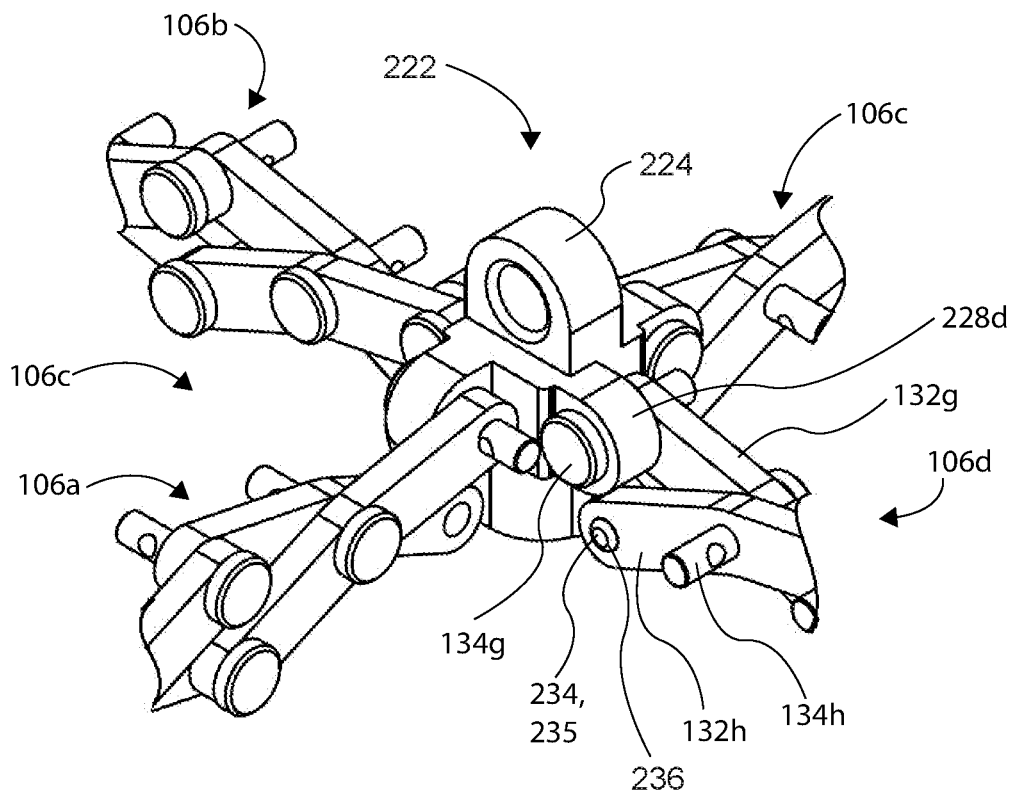
FIG. 3B is an isometric view of the hub component of FIG. 3A coupled to the support structure framework of FIG. 1A (i.e., replacing the hub component(s) of FIG. 1A).

FIGS. 3A and 3B show an alternative hub component 222, which can replace either or both of the upper and/or lower hub components 122a and 122b discussed above. The hub component 222 can comprise a tether attachment portion 224 having an aperture 226 for facilitating coupling the hub component 222 to a tether (e.g., 120 of FIG. 1A), and can comprise a plurality of frame attachment portions 228a-d having respective apertures 230a-d for facilitating coupling of the hub component 222 to ends of respective support structures (e.g., support structures 106a-d). The tether attachment portion 224 can extend away from the plurality of frame attachment portions 228a-d, while the plurality of frame attachment portions 228a-d each extend in different directions from each other and laterally from the tether attachment portion 224 in a similar manner as described above with respect to the upper and lower hub components 122a and 122b.

The hub component 222 can further comprise a frame locking mechanism 234 that is operable to lock the plurality of support structures 106a-d in the expanded position E of FIG. 3B (see also FIG. 1A). The frame locking mechanism 234 can comprise a spring loaded pin 235 supported by a lock support portion 232 that extends outwardly and below the frame attachment portion 228d. The spring loaded pin 235 can be supported in a biased manner via an internal spring (hidden, not shown) that can be supported inside of a cavity of the lock support portion 232. The spring loaded pin 235 is shown in a normal expanded position in FIG. 3A, and can be pushed inwardly upon an applied load, as further detailed below.

An end of an end linkage (e.g. linkage 132g) of the support structure 106a can be pivotally coupled to the frame attachment portion 228a via a pin 134g that extends through the aperture 230d of the hub component 222, thereby coupling the support structure 106a to the hub component 222. The same configuration applies for the other support structures 106b-d being pivotally coupled to respective frame attachment portions 228b-d in a similar manner, as well as to a lower hub component, which can be configured similarly as the hub component 222. A locking linkage 132h (which is pivotally coupled to the end linkage 132g) operates with the frame locking mechanism 234 to lock all of the support structures 106a-d in the expanded position E, so that they cannot inadvertently collapse to the collapsed position (e.g., due to currents or movement in the ocean generating forces that are applied or imparted to the framework 104).

Therefore, when the support structures 106a-d are moved to the expanded position E, the locking linkage 132h is rotated relative to the spring loaded pin 235, and then slides along the spring loaded pin 235 to compress it inwardly (via compression of the internal spring) until such time that an aperture 236 of the locking linkage 132h is aligned with the spring loaded pin 235. At this moment, the spring loaded pin 235 is caused, under the spring forces generated by the spring acting on the spring loaded pin 235, to move into the aperture 236 of the locking linkage 132h (because of the expansion of the internal spring applying a force to the spring loaded pin 235 to move the spring loaded pin 235 into the aperture 236 of the locking linkage 132h). This operation locks the support structure 106a to the hub component 222 when the framework 104 is moved to the expanded position E, because the spring loaded pin 235 and the pins 134g and 134h cooperate together to restrict rotation of the support structure 106a relative to the hub component 222. Note that, where another hub component 222 is incorporated on a lower end of the support structure 106a (like in FIG. 1A), the lower ends of the support structure 106a-d are also locked in place to such lower hub component. Therefore, the framework (e.g., 104) can be locked in the expanded positions via upper and lower hub components (e.g., 222) having locking mechanisms.

Further note that only one locking hub component (e.g., 222) may be necessary, such that the other hub component (e.g., the lower hub component) is not required to have a locking function. This is because one locking hub component like 222 can lock all the support structures 110a-d in the expanded position E, because any one support structure (e.g., 106b-d) cannot collapse unless all the other support structures (e.g., 106a) can collapse as the support structures and the hub components are all liked together as will be recognized and appreciated by those skilled in the art.

Figure 4:
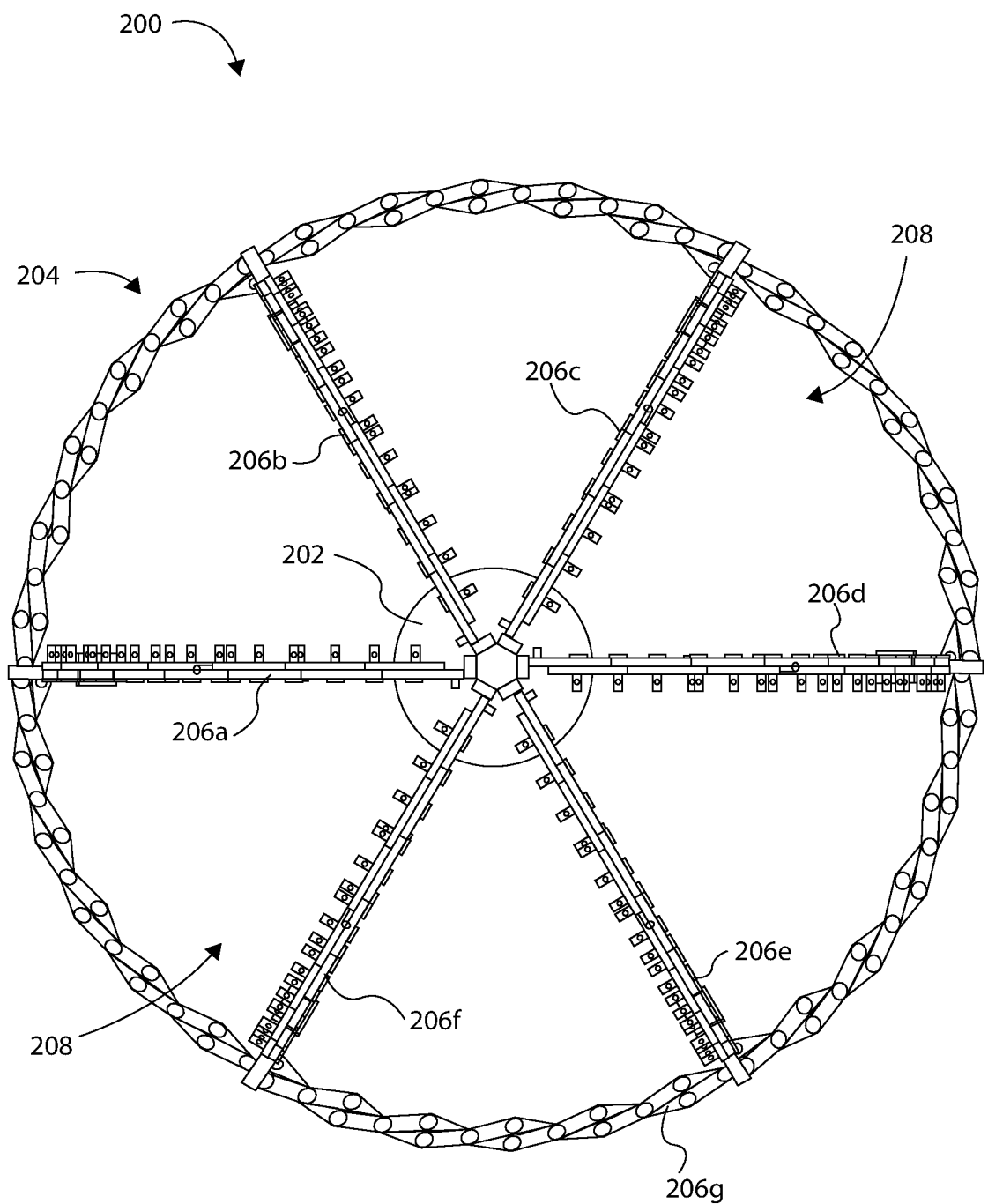
FIG. 4 is a top view of a sensor suspension system in an expanded position and positioned in an underwater environment, in accordance with an example of the present disclosure.

FIG. 4 shows a top view of an alternative sensor suspension system 200 for use in an underwater environment, in accordance with an example of the present disclosure. Similarly as described above regarding the sensor suspension system 100 of FIGS. 1A-1H, the sensor suspension system 200 can comprise a sensor 202 supported, in part, by a framework 204 comprising a plurality of support structures 206a-f defining an inner volume 208 sized and configured to receive the sensor 202. The sensor suspension system 200 can further comprise a plurality of compliant devices (hidden; not shown), which can be elastomeric bands or members that couple the sensor 202 to the framework 204 so as to suspend the sensor 202 within the inner volume 208 (similarly as discussed above, and shown in FIG. 1A). In this manner, the plurality of compliant devices facilitate a symmetrical sensing response of the sensor 202 in at least one degree of freedom upon being deployed in the underwater environment, similarly as described with reference to the example of FIG. 1A. Thus, the sensor suspension system 200 can be suspended in the underwater environment by being tethered or attached to a base or anchor that secures the sensor suspension system 200 to an underwater surface of the underwater environment, and by being tethered to a buoyant device via a tether (e.g., see FIGS. 1A, 6B, 8B).

Note that, the support structures 206a-f can comprise six total support structures that each define a substantially spherical shape and a corresponding perimeter envelope or boundary. In another example, eight or more support structures could be utilized. In some examples, one or more supplemental support structures (e.g., supplemental support structure 206g) can be pivotally coupled to each of the support structures 206a-h, such that the supplemental support structure 206g extends laterally around the framework 204 (e.g., positioned so as to extend around an equator defined by the support structures 206a-f). The one or more supplemental support structures (e.g., 206g) can be similarly constructed as the other support structures (see e.g., 106a of FIGS. 1G and 1H), or it/they can be constructed of a plurality of individual support structures pivotally coupled to adjoining support structures 206a-f via hub components (similar to the hub component 122a and 122b of FIG. 2A). The supplemental support structure 206g can contribute to the "rugged" protective nature of the framework 204 for protection of the sensor 202 when in a collapsed position, because it can provide additional structural support (e.g., lateral support) to the framework 204 to support and protect the sensor 202.

Figure 5:
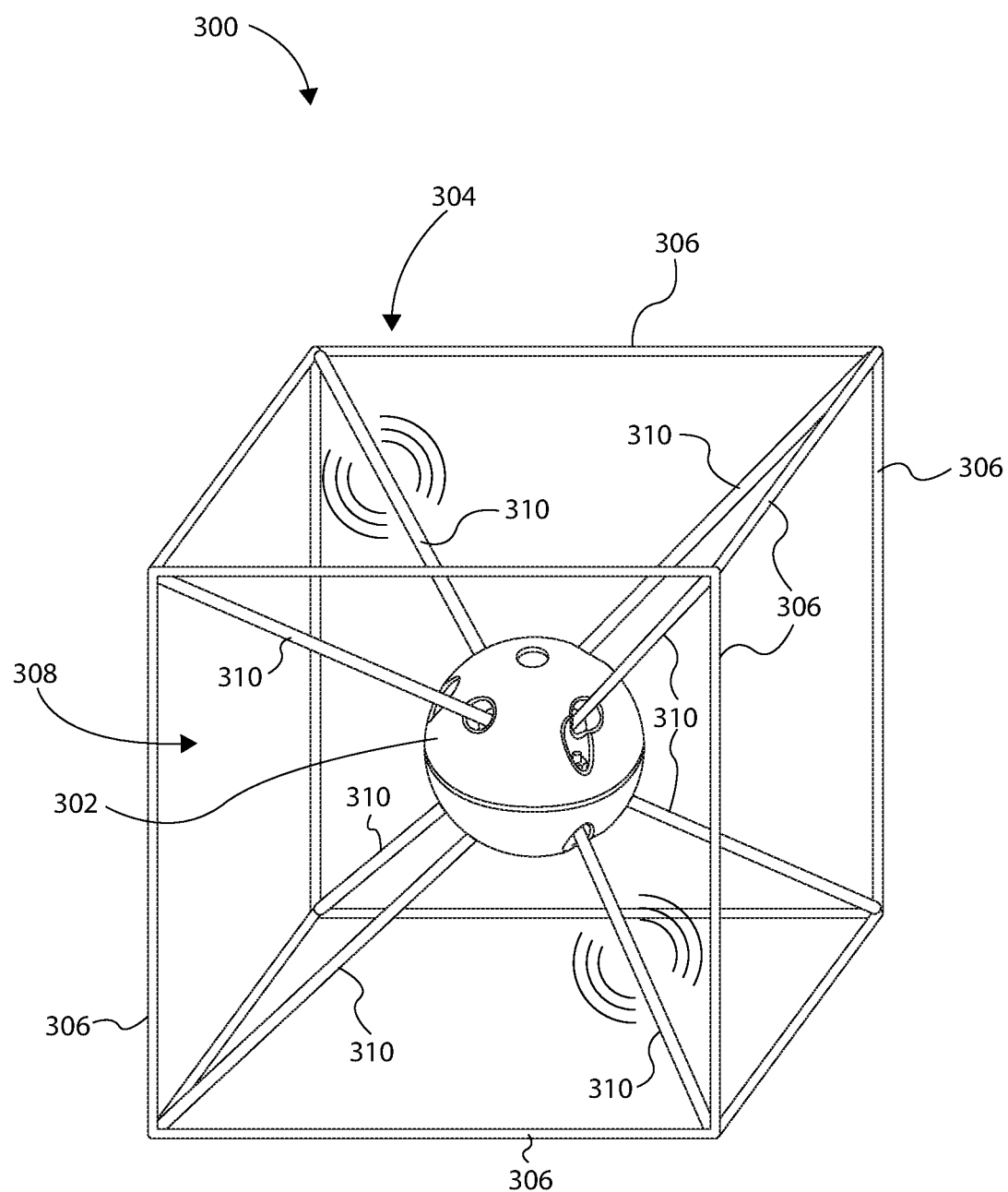
FIG. 5 is an isometric view of a sensor suspension system in an expanded position, in accordance with an example of the present disclosure.

FIG. 5 illustrates an alternative sensor suspension system 300 for use in an underwater environment, in accordance with an example of the present disclosure. Similar to the sensor suspension system 100 of FIGS. 1A-1C, the sensor suspension system 300 can comprise a sensor 302 and a framework 304 comprising a plurality of support structures 306 defining an inner volume 308 sized and configured to receive the sensor 302. The sensor suspension system 300 can further comprise a plurality of compliant devices 310 (e.g., 8×), such as elastomeric bands or members, that couple the sensor 302 to the framework 304 so as to suspend the sensor 302 within the inner volume 308. In this manner, the plurality of compliant devices 310 facilitate a symmetrical sensing response of the sensor 302 in at least one degree of freedom upon being deployed in the underwater environment, similarly as described above, and with reference to the example of FIG. 1A. Thus, the sensor suspension system 300 can be suspended in the underwater environment by tethering a lower end of the framework 304 to a base or anchor that secures the sensor suspension system 300 to an underwater surface of the underwater environment, and by tethering an upper end of the framework 304 to a buoyant device via a tether (e.g., see FIGS. 1A, 6B, 8B).

Note that, unlike those discussed above, the support structures 306 can comprise a rigid, fixed framework structure that does not collapse or expand, and therefore can be defined by a number of rigid members (e.g., metal posts, beams, rods) welded or fastened together, and that define a substantially cuboid envelope or shape. Therefore, the sensor suspension system 300 can be stowed, transported, and deployed in the form factor shown in FIG. 5. Alternatively, the framework 304 can be comprised of a plurality of support structures having linkages pivotally coupled together to move between expanded and collapsed positions, and that provide the cuboid configuration.

Figure 6A:
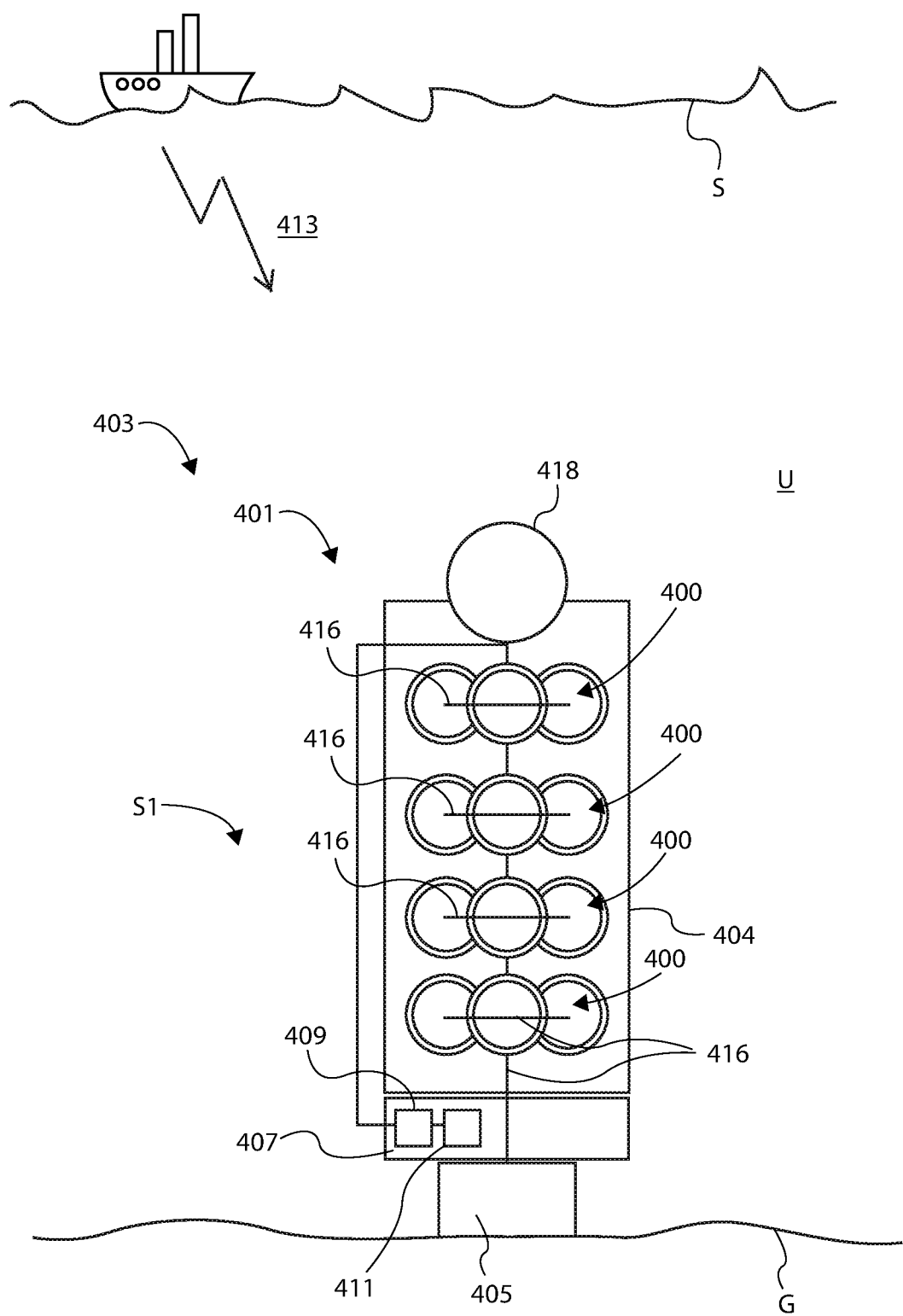
FIG. 6A is a schematic elevation view of a sensor array deployment system having a plurality of sensor suspension systems in a stowed configuration, and in an underwater environment, in accordance with an example of the present disclosure.
Figure 6B:
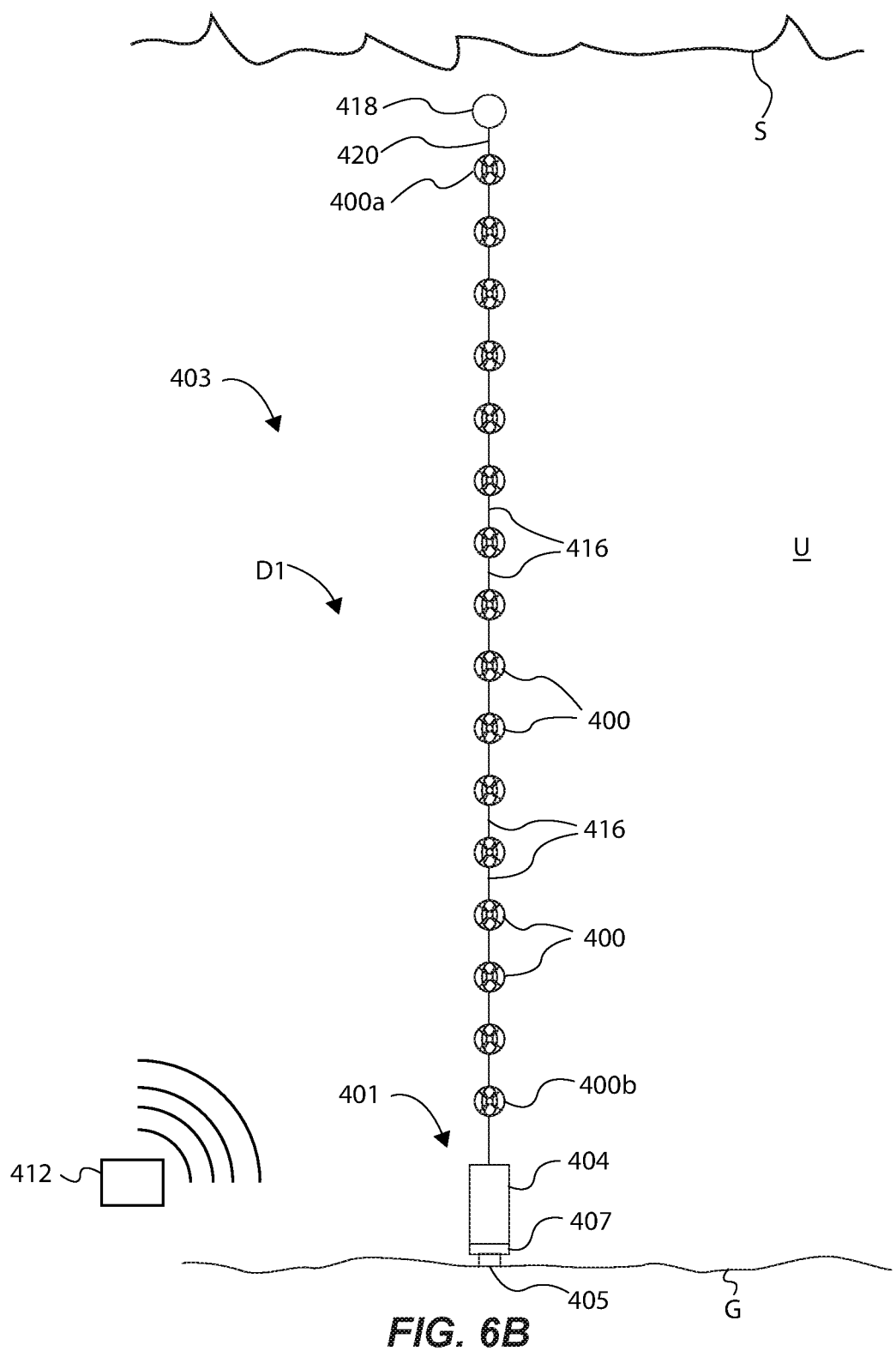
FIG. 6B is a schematic elevation view of the sensor array deployment system of FIG. 6A, showing the plurality of sensor suspension systems deployed by a deployment control system of the sensor array deployment system, wherein the plurality of sensor suspension systems are deployed into a sensor array in the underwater environment.

FIGS. 6A and 6B schematically illustrate a sensor array deployment system 403, and an associated method, for deploying a sensor array A1 in an underwater environment, in accordance with an example of the present disclosure. The sensor array deployment system 403 can comprise a deployment control system 401 operable for placement on an underwater surface G of the underwater environment U. The deployment control system 401 can comprise a container 404, such as a large cylindrical drum or other container, and an anchor or base 405 having one or more structural components that provide sufficient negative buoyancy to maintain the position of the container 404, and other components of the system 401, on the underwater surface G. The deployment control system 401 can further comprise an electronics support housing 407 coupled to the base 405 (or part of the base 405) for supporting and housing electronics that operate to deploy and/or operate the sensor array A1.

For instance, a controller 409 and a receiver 411 can be communicatively coupled together, and can be supported in the electronics support housing 407. The container 404 can support and/or house a plurality of sensor suspension systems 400 that are tethered together by tethers 416, and that are in a stowed configuration S1. The sensor suspension systems 400 are shown schematically, but each can be any one of the sensor suspensions systems disclosed herein, or their equivalents. The sensor suspension systems 400 can be tethered to the base 405 on one end, and to a buoyant device 418 (e.g., buoy) on the other end of the sensor suspension systems 400 via tether 420.

The buoyant device 418 can be operable with the plurality of sensor suspension systems 400, which can mean that the buoyant device 418 is directly attached to the framework of a top or upper sensor suspension systems 400, or it can be tethered to the framework of the top or upper suspension system 400 as schematically illustrated in FIGS. 6A and 6B.

In one example, the sensor suspension systems 400 can be in the stowed configuration S1 inside of the container 404, and can be stowed in the container 404 with their respective frameworks in their collapsed positions, such as exemplified in FIGS. 1D-1G. The sensor suspension systems 400 can be tethered together in series via a plurality of tethers 416 coupling together adjacent respective upper and lower hub components, for instance, such as via the hub components 122a and 122b of FIGS. 1A and 2A-2C, and/or hub component 222 of FIG. 3A.

The deployment control system 401, when supporting the sensor suspension systems 400 in the stowed configuration S1, can be lowered or dropped from a vessel or underwater vehicle, so that the deployment control system 401 comes to rest or is otherwise situated on the underwater surface G in a vertical manner as shown in FIG. 6A. In one example of activating deployment of the sensor array A1 to the deployed configuration of FIG. 6B, an acoustic deployment signal 413 can be transmitted through the water via an acoustic transmitter (e.g., on a vessel, buoy, underwater vehicle). The receiver 411 can be configured to receive the acoustic deployment signal 413, and then configured to transmit a command signal to the controller 407 for causing release of the buoyant device 418 from the container 404 (or even from outside of the container 404 in another example). The buoyant device 418 can be a typical buoy, or it can be a device that inflates upon being activated, such as a compressed gas inflation bladder or device. Once released or activated via the controller 407, the buoyant device 418 ascends towards the surface S of the water. The ascension of the buoyant device 418 functions to apply a tension force to the first or adjacently attached sensor suspension system 400, thus pulling the sensor suspension systems 400 from the container 404 to vertically position the sensor suspension systems 400 into a vertical position. Each subsequent sensor suspension system 400 is similarly acted upon by the continued ascension of the buoyant device until all of the sensor suspension systems 400 are deployed into their respective positions to form the sensor array A1, with at least one of the sensor suspension systems 400 being anchored or tethered to the base 405 of the deployment control system 401 to maintain the sensor array in a desired position and at a desired depth within the water, as illustrated in FIG. 6B. Even when fully deployed, the buoyant device maintains a constant tension force on each of the sensor suspension systems 400 throughout the sensor array A1. Alternatively, the controller 407 can be operable to release the buoyant device 418 via a timer programmed to effectuate release at a specified time.

Furthermore, in the example where the sensor suspension systems 400 are in a collapsed position when stowed by the container 404, when the buoyant device 418 ascends toward the surface S, a pulling force or tension load is exerted by the buoyant device 418 to all of the sensor suspension systems 400 via the tether 420 and the other tethers 416. Because the sensor array A1 is tethered to the base 405, this pulling force from the buoyant device 418 causes each of the sensor suspension systems 400 to move from a collapsed position to an expanded position, thereby exposing and suspending each sensor (e.g., 102) that is suspended within the framework (e.g., 104) via two or more compliant devices (e.g., 110a-h). Note that the positive buoyancy force of the buoyant device 418 is sufficient to overcome the negative buoyancy force of the collection of the sensor suspension systems 400 and the tethers 416 and 420, but is not sufficient to overcome the negative buoyancy of the base 405. In this way, the sensor array A1 is suspended or positioned in the water column at a given or desired depth so that each sensor (e.g., 102) can operate to generate or produce sensor output data from sound waves impinging onto the sensors from an object 412, for instance.

The sensor output data generated by the sensors (e.g., 102) can be stored in a memory device of each sensor, and/or it can be wirelessly transmitted to the receiver 411 or the memory device for storage and later retrieval. After a certain amount of time collecting data, some or all of the deployment control system 401 can be retrieved for retrieving and processing the sensor output data generated by the sensors. In one example of retrieval, an acoustic retrieval signal can be transmitted from a transmitter through the water environment to the receiver 411. The receiver 411 can then transmit a command signal to the controller 409 for releasing the deployment control system 401 (minus the base 405 which remains on the underwater surface G), the electronics support housing 407 (including the memory device) and the sensor suspension systems 400. As a result, the buoyancy device 418 and the collection of sensor suspension systems 400 can ascend to the surface S of the water for retrieval by a vessel or other vehicle or system, so that the sensors and the electronics support housing 407 can be recovered for processing.

The release of the electronics support housing 407, the sensor array A1 of the collection of sensor suspension systems 400, and the electronics support housing 407 from the base 405 can be achieved by any suitable release system, such as by activating a burn wire, or an actuator that releases a coupling member between the base 405 and the structure of the electronics support housing 407, or by any other suitable release means for underwater release of these components. The release of the buoyant device 418 from the container 404 can be achieved by suitable means, such as by the controller 409 causing activation of an actuator, burn wire, or other movable component that causes movement of some component to release from another component.

Note that the electronics support housing 407 can comprise a power source, such as a battery, and also a processor coupled to the transmitter and the controller for processing information associated with receiving acoustic signals and with causing deployment of the sensor suspension systems and release of the sensor array A1 to the surface of the water. One or more memory devices can be coupled to the processor for storing and accessing memory, such as computer readable medium in the form of software having instructions executable by the processor to facilitate the various functions described herein, such as causing the controller to release the buoyant device.

FIGS. 7A-8B schematically illustrate a sensor array deployment system 503, and an associated method, for deploying a sensor array A2 (e.g., FIG. 8B) in an underwater environment, in accordance with an example of the present disclosure. The sensor array deployment system 503 can comprise a deployment control system 501 operable for placement on an underwater surface G of the underwater environment U. The deployment control system 501 can comprise many of the same components and functionality as the system 401 described with reference to FIG. 6A, such as a processor, receiver, controller, memory, base or anchor, etc., which can all be aspect of a base 505 that is shown schematically.

Figure 7B:
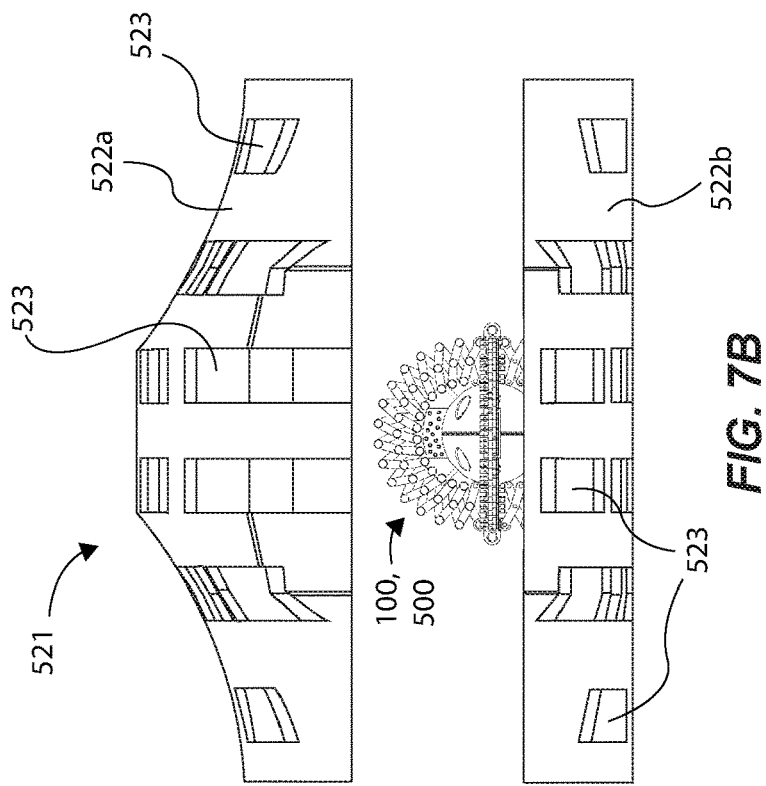
FIG. 7B is a side elevation view of the sensor release system of FIG. 7A, and showing an upper housing released from a lower housing to expose and release the sensor suspension system.
Figure 7A:
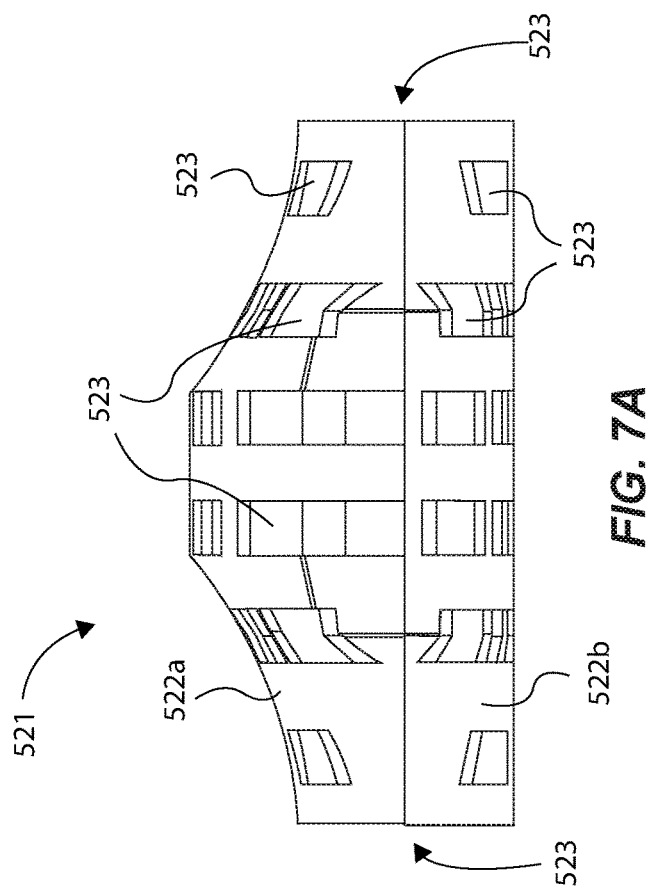
FIG. 7A is a side elevation view of a sensor release system as part of a sensor array deployment system in support of and housing a sensor suspension system in a collapsed position and in a stowed configuration, in accordance with an example of the present disclosure.
Figure 8A:
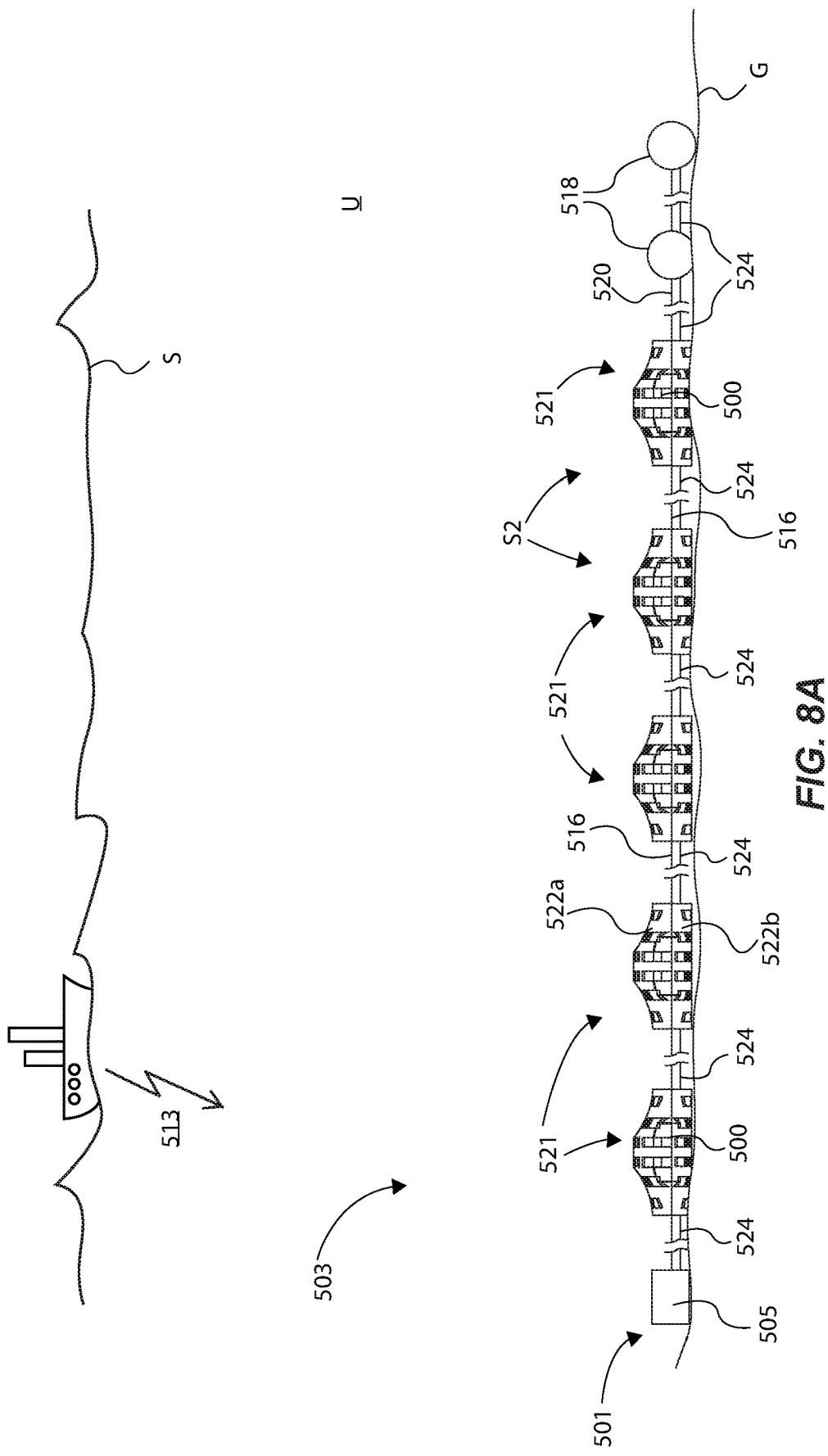
FIG. 8A is a schematic elevation view of a sensor array deployment system having a plurality of sensor suspension systems in a stowed configuration within a plurality of sensor release systems, respectively, and in an underwater environment, in accordance with an example of the present disclosure.

In this example, the sensor array deployment system 503 can be situated along the underwater ground surface G in the position shown in FIG. 8A, thus being in a position ready for deployment of sensor suspension systems 500 in the sensor array A2 shown in FIG. 8B. More specifically, the sensor array deployment system 503 can comprise a plurality of sensor release systems 521 that each comprise upper and lower housings 522a and 522b (FIGS. 7A and 7B) removably coupled to each other. The upper and lower housings 522a and 522b can comprise shell halves having apertures formed therein that allow free flow of water in and out of the sensor release systems 521, and that cooperate to contain and support a sensor suspension system 500, which can be in a collapsed position. The upper and lower housings 522a and 522b can each have a plurality of apertures or openings 523 formed through their walls to allow free flow of water through the housings 522a and 522b. The upper and lower housings 522a and 522b can be coupled together via a spring release mechanism that is actuated by a burn wire or similar/suitable actuation system, in one example.

The upper and lower housings 522a and 522b can be comprised of a rigid material, such as titanium, stainless steel, etc., and the upper housing 522b can further include (a positively buoyant material (e.g., a high density rigid foam, bladder, or other). Thus, upon activation or release of the upper housing 522a from the lower housing 522b, the upper housing 522a can float toward the surface S, therefore exposing the sensor suspension system 500 for deployment into the sensor array A2.

With further reference to FIG. 8A, the sensor release systems 521 can be coupled together in series and to the base 505 via suitable means, such as by cables 524 of a cable system that holds the lower housings 522a of the sensor release systems 521 to the underwater surface G. A plurality of tethers 516 and 520 (see e.g., FIG. 8B) can extend along the cables 524 from the control base 505 to tether together sensor suspension systems 500 and the buoyant devices 518.

The buoyant devices 518 can be operable with the plurality of sensor suspension systems 500, which can mean that one buoyant device 518 is directly attached to the framework of an immediately adjacent top or upper sensor suspension systems 500a, or it can be tethered to the framework of the top sensor suspension system 500a via tether 520, as shown.

The sensor suspension systems 500 can be stowed in the collapsed positions, such as shown in FIG. 7B, and can be tethered together in series via the plurality of tethers 516 coupling together adjacent respective upper and lower hub components, such as the upper and lower hub components (122a, 122b, 222).

The sensor array deployment system 503 can be lowered or dropped from a vessel or underwater vehicle, such that the sensor array deployment system 503 comes to rest or is otherwise situated on the underwater surface G in a horizontal manner as shown in FIG. 8A. In one example of activating deployment of the sensor array A2 to the deployed configuration of FIG. 8B, an acoustic deployment signal 513 can be transmitted through the water via an acoustic transmitter (e.g., on a vessel, buoy, underwater vehicle). The receiver of the deployment control system 501 can be configured to receive the acoustic deployment signal 513, and then configured to transmit a command signal to the controller for causing release of the buoyant devices 518 and concurrent release of the upper housings 522a from the lower housings 522b. The command signal can be used to trigger a first burn wire operation that causes release of the upper housing 522a from the lower housing 522b via the one or more spring sets. Another command signal can then be sent from the control base 505 to trigger a second burn wire operation that causes release of the buoyant devices 518, such as by releasing cable clamps that are clamping the buoyant devices 518 to the cables 524. Once the upper housings 522a are all released, and the buoyant devices 518 are released, the buoyant devices 518 ascend towards the surface S of the water to vertically position the plurality of sensor suspension systems 500 into the sensor array A2 while anchored or tethered to the base 505, as illustrated in FIG. 8B.

Note that, when the buoyant devices 518 ascend towards the surface S, a pulling or tension force is exerted by the buoyant devices 518 to all of the sensor suspension systems 500 via the tethers 520 and 516. Because the sensor suspension systems 500 are tethered to the base 505, this pulling force causes each of the sensor suspension systems 500 to move from the collapsed position to the expanded position, thereby exposing each sensor (e.g., 102) that is suspended within the framework (e.g., 104) via two or more compliant devices (e.g., 110a-h). The sensor output data generated by the sensors of array A2 can be stored and retrieved in a similar manner as described above regarding FIGS. 6A and 6B, or by other suitable means.

Note that a single sensor suspension system may be deployed and tethered between a base and a buoyant device, or a plurality of sensor suspension systems (e.g., 2 or more) can be tethered together and to the underwater surface.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A sensor suspension system for use in an underwater environment,
the sensor suspension system, comprising:
a sensor:
a framework comprising a plurality of support structures, the framework defining an inner volume sized and configured to receive the sensor, wherein the plurality of support structures each comprise a plurality of linkages pivotally coupled together, such that the framework is moveable between a collapsed position and an expanded position, relative to the sensor, via pivotal movement of the linkages; and
a plurality of compliant devices extending between the framework and the sensor, the plurality of compliant devices extending in different directions from the sensor within the inner volume of the framework so as to suspend the sensor within the inner volume,
wherein the plurality of compliant devices facilitate a symmetrical sensing response of the sensor in at least one degree of freedom when deployed in the underwater environment.

2. The sensor suspension system of claim 1, wherein the plurality of compliant devices are constructed of an elastomeric material, and are tuned such that a resulting resonant frequency of the sensor and the suspension system, the sensor being suspended by the plurality of compliant devices and when deployed in the underwater environment, is outside of a frequency of interest band of the sensor.

3. The sensor suspension system of claim 1, wherein the plurality of compliant devices comprises a first set of compliant devices coupled to a first side of the sensor, and a second set of compliant devices coupled to a second side of the sensor opposite the first side, such that the plurality of compliant devices facilitate symmetrical sensing response of the sensor in three degrees of freedom upon being deployed in the underwater environment.

4. The sensor suspension system of claim 3, wherein the sensor comprises first and second housing halves coupled together, wherein the first set of compliant devices are coupled to the first housing half, and the second set of compliant devices are coupled to the second housing half.

5. The sensor suspension system of claim 1, wherein the plurality of support structures comprises at least four support structures defining a substantially spherical envelope.

6. The sensor suspension system of claim 1, further comprising an upper hub component coupling together upper ends of each support structure, and a lower hub component coupling together lower ends of each support structure, wherein the upper and lower hub components are configured to be coupleable to respective upper and lower tethers for positioning the sensor suspension system in the underwater environment.

7. The sensor suspension system of claim 1, further comprising an upper hub component pivotally coupling together upper ends of each of the plurality of support structures, and a lower hub component pivotally coupling together lower ends of each of the plurality of support structures, wherein the upper and lower hub components facilitate movement of the framework from the collapsed position to the expanded position.

8. The sensor suspension system of claim 7, wherein at least one of the upper and lower hub components comprises a frame locking mechanism operable to lock the plurality of support structures in the expanded position via locking at least two linkages together to the at least one upper or lower hub components.

9. The sensor suspension system of claim 1, wherein the framework defines a substantially spherical envelope when in the collapsed position and in the expanded position.

10. The sensor suspension system of claim 1, wherein each linkage of the plurality of linkages is pivotally coupled to three adjacent linkages by respective joint members.

11. The sensor suspension system of claim 1, further comprising at least one spacer cushion supported about an inner side of each of the plurality of support structures, such that the spacer cushions are situated between the support structures and the sensor for damping or shock absorption to the sensor when in the collapsed position.

12. The sensor suspension system of claim 1, wherein the compliant devices comprise elastomeric bands operable to stretch when the framework is moved to the expanded position, thereby positioning the sensor in a center area of the inner volume of the framework.

13. The sensor suspension system of claim 1, wherein the sensor comprises a vector sensor configured to generate output data associated with sound waves traveling through the underwater environment, and wherein the plurality of compliant devices are arranged in different directions to facilitate a symmetrical sensing response of the vector sensor in three degrees of freedom in response to sound waves impinging on the vector sensor.

14. The sensor suspension system of claim 1, wherein the plurality of support structures define a plurality of openings between adjacent support structures, such that sound waves translated through the underwater environment are not substantially impinged by the support structures while passing through the openings to the sensor.

15. A sensor suspension system for use in an underwater environment, the sensor suspension system, comprising:
a framework comprising a plurality of support structures, the framework defining an inner volume sized and configured to receive a sensor, wherein the plurality of support structures each comprise a plurality of linkages pivotally coupled together, such that the framework is moveable between a collapsed position and an expanded position, relative to the sensor, via pivotal movement of the linkages; and a plurality of compliant devices extending between the framework and the sensor, the plurality of compliant devices extending in different directions from the sensor within the inner volume of the framework so as to suspend the sensor within the inner volume, wherein the plurality of compliant devices facilitate a symmetrical sensing response of the sensor in at least one degree of freedom when deployed in the underwater environment.

\* \* \* \* \*